US012631319B2

(12) United States Patent
Xu

(10) Patent No.: US 12,631,319 B2
(45) Date of Patent: May 19, 2026

(54) LIGHT-EMITTING BODY ASSEMBLED BY MODULAR ASSEMBLY, LIGHT-EMITTING BODY MODULE, LAMP, AND LIGHT-EMITTING DEVICE

(71) Applicant: JIANGMEN CITY SHENGDA LIGHTING CO., LTD., Jiangmen (CN)

(72) Inventor: Xiaojun Xu, Jiangmen (CN)

(73) Assignee: JIANGMEN CITY SHENGDA LIGHTING CO., LTD., Jiangmen (CN)

( * ) Notice: Subject to any disclaimer, the term of this patent is extended or adjusted under 35 U.S.C. 154(b) by 0 days.

(21) Appl. No.: 18/961,454

(22) Filed: Nov. 27, 2024

(65) Prior Publication Data

US 2025/0093021 A1 Mar. 20, 2025

(30) Foreign Application Priority Data

Sep. 19, 2024 (CN) ......................... 202422292417.1

(51) Int. Cl.

| | |
|---|---|
| ***F21V 23/06*** | (2006.01) |
| ***F21V 3/02*** | (2006.01) |
| ***F21V 21/005*** | (2006.01) |
| ***F21V 21/14*** | (2006.01) |
| ***F21Y 107/30*** | (2016.01) |
| ***F21Y 115/10*** | (2016.01) |

(52) U.S. Cl.
CPC ................ *F21V 23/06* (2013.01); *F21V 3/02* (2013.01); *F21V 21/005* (2013.01); *F21V 21/14* (2013.01); *F21Y 2107/30* (2016.08); *F21Y 2115/10* (2016.08)

(58) Field of Classification Search
CPC .......... F21V 23/06; F21V 3/02; F21V 21/005; F21V 21/14; F21Y 2107/30; F21Y 2115/10; F21S 2/005
See application file for complete search history.

(56) References Cited

U.S. PATENT DOCUMENTS

| | | | | |
|---|---|---|---|---|
| 8,371,894 B1 * | 2/2013 | Rosen | .................. | A63H 33/108 446/485 |
| 11,802,682 B1 * | 10/2023 | Choy | ......................... | F21V 3/02 |
| 2012/0314422 A1 * | 12/2012 | Dong | .................... | F21V 23/006 362/373 |

(Continued)

*Primary Examiner* — Tsion Tumebo

(57) ABSTRACT

A light-emitting body assembled by modular assembly, a light-emitting body module, a lamp, and a light-emitting device includes a first circuit structure, a power connector, and a light-emitting unit. The first circuit structure includes a first protrusion. The power connector is rigidly connected to one end of the first circuit structure. The first circuit structure is electrically connected to an external power connecting terminal through the power connector. The light-emitting unit is disposed around the first circuit structure. The light-emitting unit is electrically connected to the first protrusion. The first protrusion extending out of the adapter connecting piece is disposed on the first circuit structure, and the first protrusion has contacts electrically connected to the light-emitting unit. No wire is needed to electrically connect the first circuit structure to the light-emitting unit, which simplifies an assembly process, eliminates use of wires, and makes the light-emitting body beautiful in appearance.

15 Claims, 34 Drawing Sheets

(56) References Cited

U.S. PATENT DOCUMENTS

| | | | | |
|---|---|---|---|---|
| 2015/0330580 | A1* | 11/2015 | Reier | F21V 23/006 362/646 |
| 2018/0106434 | A1* | 4/2018 | Gao | F21V 29/70 |
| 2018/0245785 | A1* | 8/2018 | Deng | F21K 9/238 |
| 2019/0211983 | A1* | 7/2019 | Shine | F21V 15/015 |
| 2019/0249831 | A1* | 8/2019 | Liu | F21V 23/003 |
| 2023/0093070 | A1* | 3/2023 | Qiao | F21V 3/02 362/235 |

* cited by examiner

LIGHT-EMITTING BODY ASSEMBLED BY MODULAR ASSEMBLY, LIGHT-EMITTING BODY MODULE, LAMP, AND LIGHT-EMITTING DEVICE

TECHNICAL FIELD

The present disclosure relates to a field of lamps, and in particular to a light-emitting body assembled by modular assembly, a light-emitting body module, a lamp, and a light-emitting device.

BACKGROUND

A light-emitting body is a main structure of a lamp. The light-emitting body carries key components, such as a light source and a control circuit, of the lamp and plays a role in supporting and protecting the key components. A design of the light-emitting body not only affects an appearance of the lamp, but also directly affects assembly efficiency, safety, waterproof and dustproof performance, and service life of the lamp.

In the prior art, when a plurality of light-emitting bodies are required to be connected in series to emit light, those skilled in the art commonly uses wires to connect circuit boards linearly disposed to realize electrical connection of the circuit boards. Two ends of each of the wires must be welded to corresponding circuit boards for fixing. A structure of the plurality of light-emitting bodies connected in series by the wires is difficult to effectively realize uniform luminescence in a circumferential direction thereof, thereby affecting an overall luminous effect of the lamp. Moreover, it is cumbersome to connecting the plurality of light-emitting bodies by wires, assembly efficiency of the plurality of light-emitting bodies is low. Therefore, improvement to assembly of the plurality of light-emitting bodies is needed.

SUMMARY

The present disclosure provides a light-emitting body assembled by modular assembly, a light-emitting body module, a lamp, and a light-emitting device. A first circuit structure thereof comprises a first protrusion extending out of an adapter connecting piece. The first protrusion has contacts electrically connected to the light-emitting unit, and no wire is needed to electrically connect the circuit board to the light-emitting unit, which simplifies an assembly process of the present disclosure, eliminates use of wires, and makes the present disclosure beautiful in appearance.

In a first aspect, the present disclosure provides a light-emitting body assembled by modular assembly. The light-emitting body comprises a first circuit structure, at least one power connector, and a light-emitting unit.

The first circuit structure comprises a first protrusion. The at least one power connector is rigidly connected to one end of the first circuit structure. The first circuit structure is electrically connected to an external power connecting terminal through the at least one power connector. The light-emitting unit is disposed around the first circuit structure. The light-emitting unit is electrically connected to the first protrusion.

Furthermore, the light-emitting body further comprises at least one adapter connecting piece. The at least one adapter connecting piece is connected to the first circuit structure. The light-emitting unit is disposed around the first circuit structure through the at least one adapter connecting piece. At least a portion of the first protrusion extends out of an outer side of the at least one adapter connecting piece.

Furthermore, the first circuit structure further comprises a second protrusion. At least one side of the at least one adapter connecting piece is clamped between the first protrusion and the second protrusion.

Furthermore, the at least one adapter connecting piece comprises a deformable piece. The deformable piece is integrally formed. The deformable piece defines a cavity penetrating through two ends of the deformable piece.

When the deformable piece is compressed, the cavity is shaped into a flat-shaped cavity. When a width of the flat-shaped cavity is matched with a width of the first circuit structure, the at least one adapter connecting piece is allowed to be sleeved on the first circuit structure.

When the at least one adapter connecting piece resets, the at least one side of the at least one adapter connecting piece is clamped between the first protrusion and the second protrusion.

Furthermore, the at least one adapter connecting piece further comprises a first hinge and a second hinge, the first hinge and the second hinge are detachably connected, and the first hinge and the second hinge are clamped on the first circuit structure.

Furthermore, the light-emitting unit comprises a second circuit structure. Lamp beads are disposed on the second circuit structure. The second circuit structure covers on the outer side of the at least one adapter connecting piece, and the second circuit structure is electrically connected to at least one of the first protrusion and the second protrusion.

Furthermore, the at least one power connector comprises a positive access terminal, a negative access terminal, and a control signal access terminal. The control signal access terminal is configured to transmit a signal for controlling a color of the light-emitting unit.

Furthermore, the at least one power connector comprises a circular plug. The positive access terminal and the negative access terminal of the circular plug are disposed in an axial direction; or the positive access terminal, the negative access terminal, and the control signal access terminal are disposed in the axial direction.

Furthermore, the at least one power connector is disposed at a predetermined angle, and the predetermined angle is in a range of 0-180 degrees.

Furthermore, the second circuit structure further comprises a first extension portion. The lamp beads are disposed on the first extension portion. A shape of the first extension portion is matched with an opening defined on a first end of the cavity. The first extension portion is connected to the opening defined on the first end of the cavity. The at least one at least one comprises one power connector, and the power connector extends out of the at least one adapter connecting piece from an opening defined a second end of the cavity.

Furthermore, the at least one power connector comprises circular plugs for plugging. The circular plugs comprise a first plug and a second plug. The first plug and the second plug respectively extend out of two ends of the cavity.

Furthermore, the circular plugs further comprise a third plug connected to the first circuit structure. The third plug is disposed perpendicular to the first plug or the second plug. The first circuit structure is disposed on two sides of the third plug. Adapter connecting pieces are disposed on two sides of the first circuit structure. A through hole is defined on a middle portion of the second circuit structure. The through hole is matched with the third plug. When the second circuit structure is covered on the adapter connecting pieces, the third plug passes through the through hole.

Furthermore, the circular plugs further comprise a fourth plug. The fourth plug is disposed on the first circuit structure. The fourth plug is disposed on a same side of the light-emitting body as the first protrusion or the second protrusion. The third plug and the fourth plug are symmetrically disposed on the first circuit structure. Semicircular grooves are respectively defined on a first end and a second end of the second circuit structure. The fourth plug is matched with any one of the semicircular grooves.

In a second aspect, the present disclosure provides a light-emitting body module. The light-emitting body module comprises more than two light-emitting bodies. Each two adjacent light-emitting bodies are plugged with each other.

Furthermore, the at least one power connector of each of the light-emitting bodies comprises a male plug and a female plug. The male plug of each of the light-emitting bodies is configured to plug with the female plug of an adjacent light-emitting body. The female plug of each of the light-emitting bodies is configured to plug with the male plug of another adjacent light-emitting piece. Each two adjacent light-emitting bodies are plugged with each other, so that the light-emitting bodies are connected freely to shape into different shapes.

Furthermore, the second circuit structure of each of the light-emitting bodies further comprises a second extension portion. When each two adjacent light-emitting bodies are plugged with each other, the second circuit structures between each two of the light-emitting bodies are gaplessly connected.

In a third aspect, the present disclosure provides a lamp. The lamp comprises a lampshade and at least one light-emitting body mentioned above.

The at least one light-emitting body is disposed in the lampshade. The at least one power connector extends out of the lampshade; and/or the lamp further comprises at least one power connecting terminal capable of being plugged into the at least one light-emitting body, the lampshade comprises at least one mounting opening matched with the at least one power connecting terminal, when the at least one power connecting terminal is connected to the at least one mounting opening of the lampshade, the at least one power connecting terminal is electrically connected to the at least one light-emitting body and supports the at least one light-emitting body.

Furthermore, when light-emitting bodies are provided, the at least one power connector of each of the light-emitting bodies comprises a male plug and a female plug. The male plug of each of the light-emitting bodies is configured to plug with the female plug of an adjacent light-emitting body. The female plug of each of the light-emitting bodies is configured to plug with the male plug of another adjacent light-emitting body. Each two adjacent light-emitting bodies are plugged with each other, so that the light-emitting bodies are connected freely to shape into different shapes.

Furthermore, the second circuit structure of each of the light-emitting bodies further comprises a second extension portion. When each two adjacent light-emitting bodies are plugged with each other, the second circuit structures between each two of the light-emitting bodies are gaplessly connected.

In a fourth aspect, the present disclosure provides a light-emitting device assembled by modular assembly. The light-emitting device comprises a mainboard, at least one power connector, and a light-emitting unit.

The mainboard comprises at least one first electric connecting portion and at least one second electric connecting portion. The at least one first electric connecting portion is protruded from an edge of a board body of the mainboard. The at least one second electric connecting portion is disposed on the board body.

The at least one power connector is electrically connected to the at least one second electric connecting portion. The at least one power connector is detachably connected to the at least one second electric connecting portion. The at least one power connector is configured to electrically connect to an external power connecting terminal.

The light-emitting unit comprises at least one third electric connecting portion electrically connected to the at least one first electric connecting portion, and the mainboard is configured to control the light-emitting unit to emit light.

The light-emitting unit is disposed around the board body, and a portion of the at least one power connector that is electrically connected to the at least one external power connecting terminal is exposed to the light-emitting unit.

In the present disclosure, the first protrusion is disposed on the first circuit structure, and the first protrusion has the contacts electrically connected to the light-emitting unit. When the light-emitting unit is disposed around the first circuit structure, the first protrusion defines positions for electrically connected to a positive electrode and a negative electrode of the light-emitting unit. For instances, contacts are respectively disposed on two sides of the first protrusion, and the contacts are respectively welded to and electrically connected to the positive electrode and the negative electrode of the light-emitting unit. Therefore, no wire is needed to electrically connect the circuit board to the light-emitting unit, which simplifies the assembly process of the present disclosure, eliminates the use of wires, and makes the present disclosure beautiful in appearance.

REFERENCE NUMERALS IN THE DRAWINGS

Figure 1:
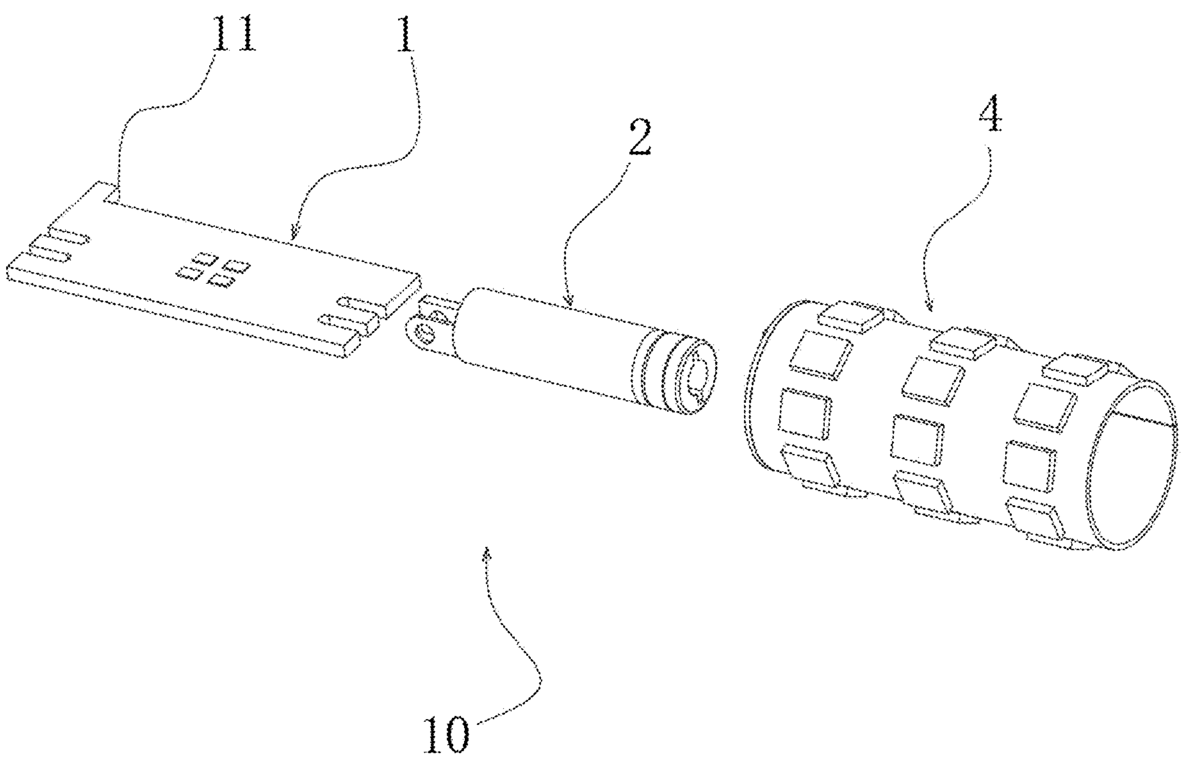
FIG. 1 is an exploded schematic diagram of a light-emitting body assembled by modular assembly according to one embodiment of the present disclosure.

1—first circuit structure; 11—first protrusion; 12—second protrusion; 13—notch; 131—connecting notch; 14—third protrusion; 101—clamping groove; 2—power connector; 21—circular plug; 211—first plug; 212—second plug; 213—third plug; 214—fourth plug; 215—fifth plug; 216—sixth plug; 217—male plug; 218—female plug; 22—positive access terminal; 23—negative access terminal; 24—control signal access terminal; 25—single-pin plug; 26—double-pin plug; 3—adapter connecting piece; 31—cavity; 32—first hinge; 33—second hinge; 4—light-emitting unit; 41—second circuit structure; 411—lamp bead; 412—first extension portion; 413—through hole; 414—semicircular groove; 415—second extension portion; 416—third electric connecting portion; 410—bending portion; 5—lampshade; 51—threaded hole; 52—accommodating cavity; 53—connecting hole; 54—first cover body; 55—second cover body; 6—power connecting terminal; 7—mainboard; 71—board body; 711—first electric connecting portion; 712—second electric connecting portion; 10—light-emitting body; 20—light-emitting body module; 30—lamp; 40—light-emitting device.

DETAILED DESCRIPTION

In order to enable those skilled in the art to better understand technical solutions of the present disclosure, technical solutions in the embodiments of the present disclosure are described clearly and completely in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

It should be noted that when one component is referred to as being "fixed on" or "disposed on" another component, it can be directly disposed on the other component or it may be indirectly fixed or disposed on the other component. When one component is said to be "connected to" another component, it may be directly connected to the other component or it may be indirectly connected to the other component.

It should be understood that in the description of the present disclosure terms such as "central", "lateral", "lengthways", "length", "width", "thickness", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "multiple" or "a plurality of" is two or more unless otherwise specified.

It is noted that structures, proportions, sizes, and the like shown in the drawings of the present specification are only used to cooperate with the contents disclosed in the description, so as to be understood and read by those skilled in the art, and are not intended to limit the limiting conditions that can be implemented by the present disclosure, so that the technical content disclosed in the present disclosure should still fall within the scope covered by the technical content disclosed in the present disclosure without affecting the effect and the purpose that can be achieved in the present disclosure.

Embodiments

The embodiments are intended to solve a problem of low efficiency of assembly of a conventional light-emitting body. The embodiments provide a light-emitting body assembled by modular assembly. A first circuit structure thereof comprises a first protrusion extending out of an adapter connecting piece. The first protrusion has contacts electrically connected to the light-emitting unit, and no wire is needed to electrically connect the circuit board to the light-emitting unit, which simplifies an assembly process of the present disclosure, avoid an accumulation of wires in the adapter connecting piece, and makes the light-emitting body beautiful in appearance.

Figure 2:
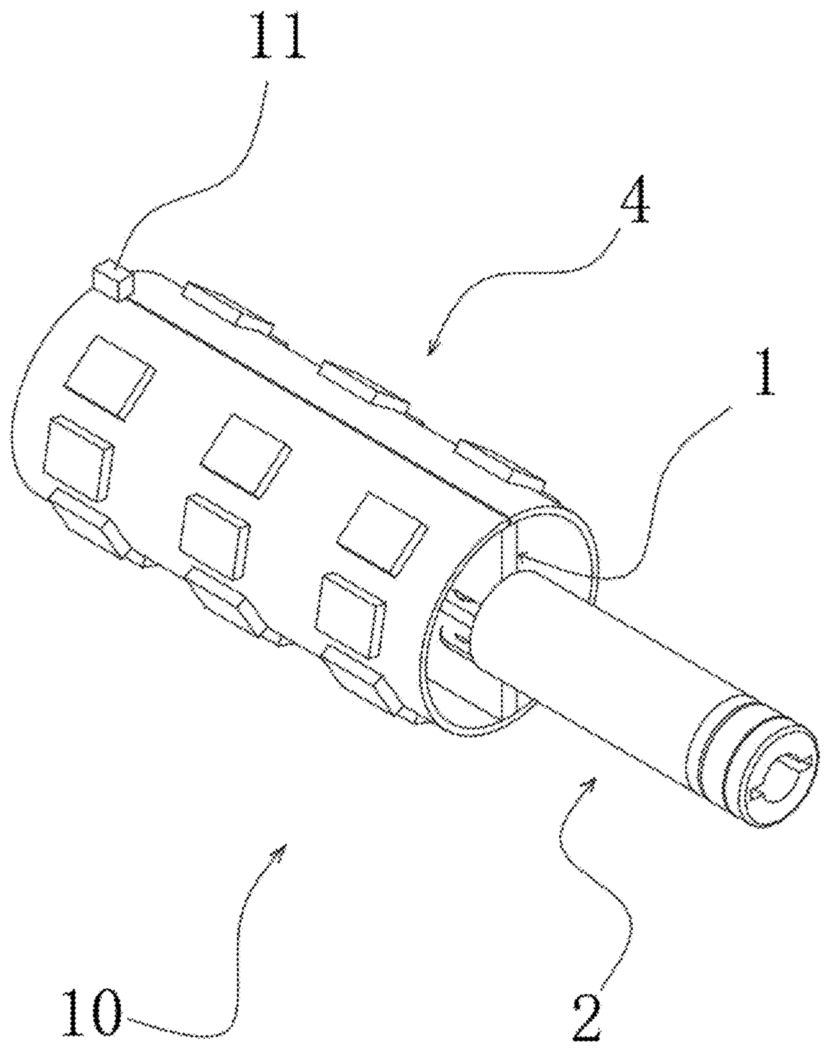
FIG. 2 is a structural schematic diagram of the light-emitting body assembled by modular assembly according to one embodiment of the present disclosure.

As shown in FIGS. 1 and 2, the present disclosure provides a light-emitting body 10 assembled by modular assembly. The light-emitting body 10 comprises a first circuit structure 1, a power connector 2, and a light-emitting unit 4. The first circuit structure 1 comprises a first protrusion 11.

The power connector 2 is rigidly connected to one end of the first circuit structure 1. The first circuit structure 1 is electrically connected to an external power connecting terminal through the power connector 2.

The light-emitting unit 4 is disposed around the first circuit structure. The light-emitting unit 4 is electrically connected to the first protrusion 11. In one embodiment, the first protrusion 11 is protruded along a radial direction of the light-emitting unit 4 disposed around the first circuit structure 1. The first circuit structure 1 is a rigid/hard circuit board. The rigid/hard circuit board means that the first circuit structure 1 is made of a rigid material. That is, the first circuit structure 1 is a conventional hard circuit board and is unable to be bent. Optionally, the power connector 2 and the first circuit structure 1 are rigidly fixed by welding. Welding is a process in which joint surfaces of two or more metal piece (or other thermoplastic materials) are atomically bonded by heating, pressurizing, or a combination thereof to form a permanent connection. During a welding process, the two or more metal pieces to be connected together are heated to a molten state (or partially molten state) or are tightly bonded by applying pressure. Subsequently, the two or more metal piece solidify during a cooling process to form a solid joint. Rigid fixation refers to a fixing method for limiting or preventing a movement or deformation of a workpiece during welding, machining, or other material processing. Specifically, the workpiece is firmly fixed in a predetermined position and posture to ensure that the workpiece does not move or deform unnecessarily due to external factors (such as gravity, thermal stress, mechanical stress, etc.) during processing or handling. The rigid fixation must have sufficient strength and rigidity to limit various forces and moments that may occur during processing or handling, thereby maintaining stability and accuracy of the workpiece.

Figure 3:
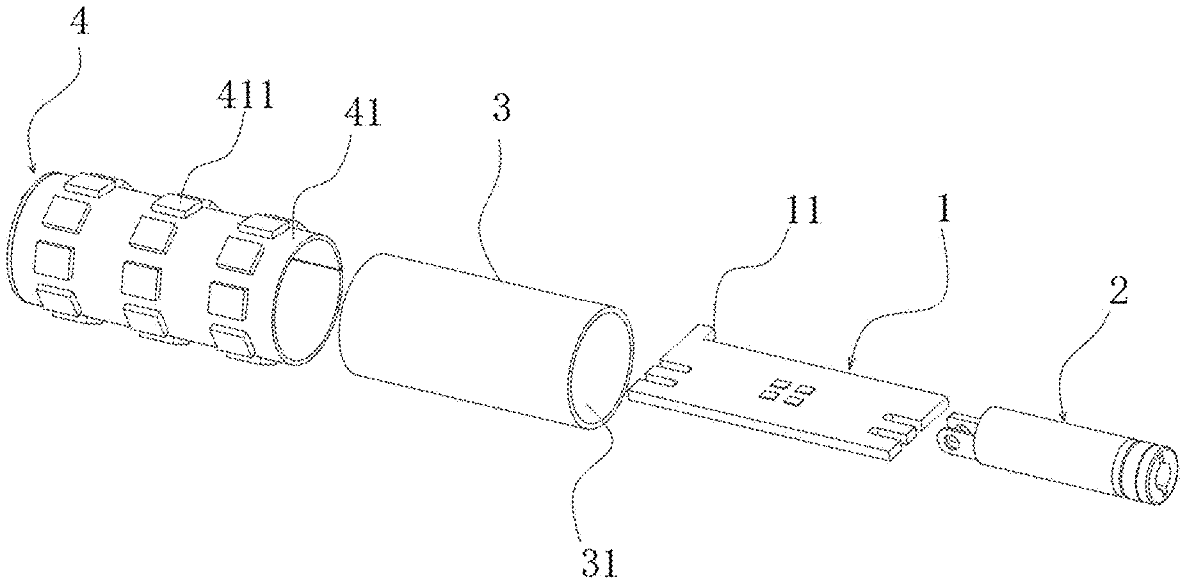
FIG. 3 is an exploded schematic diagram of the light-emitting body including an adapter connecting piece according to one embodiment of the present disclosure.
Figure 4:
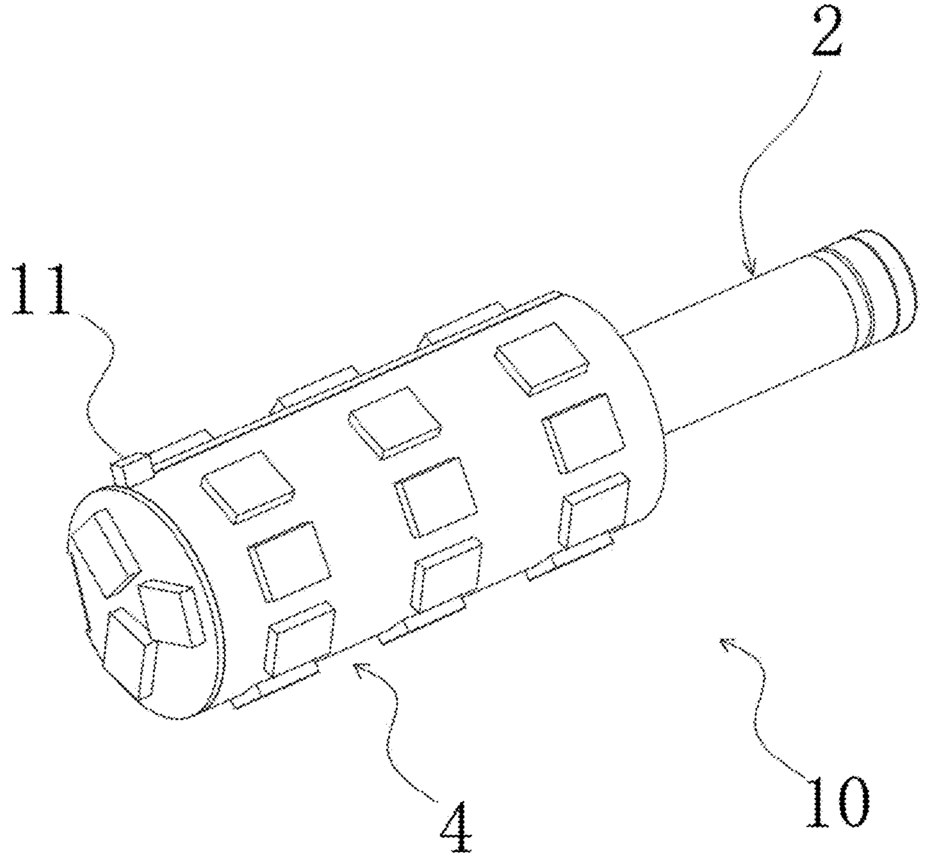
FIG. 4 is a structure schematic diagram of the light-emitting body including the adapter connecting piece according to one embodiment of the present disclosure.

As shown in FIGS. 3 and 4, in one embodiment, the light-emitting body 10 further comprises an adapter connecting piece 3. The adapter connecting piece 3 is connected to the first circuit structure 1. The light-emitting unit 4 is disposed around the first circuit structure 1 through the adapter connecting piece 3. At least a portion of the first protrusion 11 extends out of an outer side of the adapter connecting piece 3. That is, the first protrusion 11 extends and exceeds a side edge of the adapter connecting piece 3 and is exposed. The light-emitting unit 4 comprises a flexible circuit board and lamp beads 411 disposed on the flexible circuit board. A flexible material of the flexible circuit board enables the light-emitting unit 4 to be bent. Therefore, the light-emitting unit 4 is enabled to be disposed around the first circuit structure 1. In one embodiment, the lamp beads are LED lamp beads.

Figure 5:
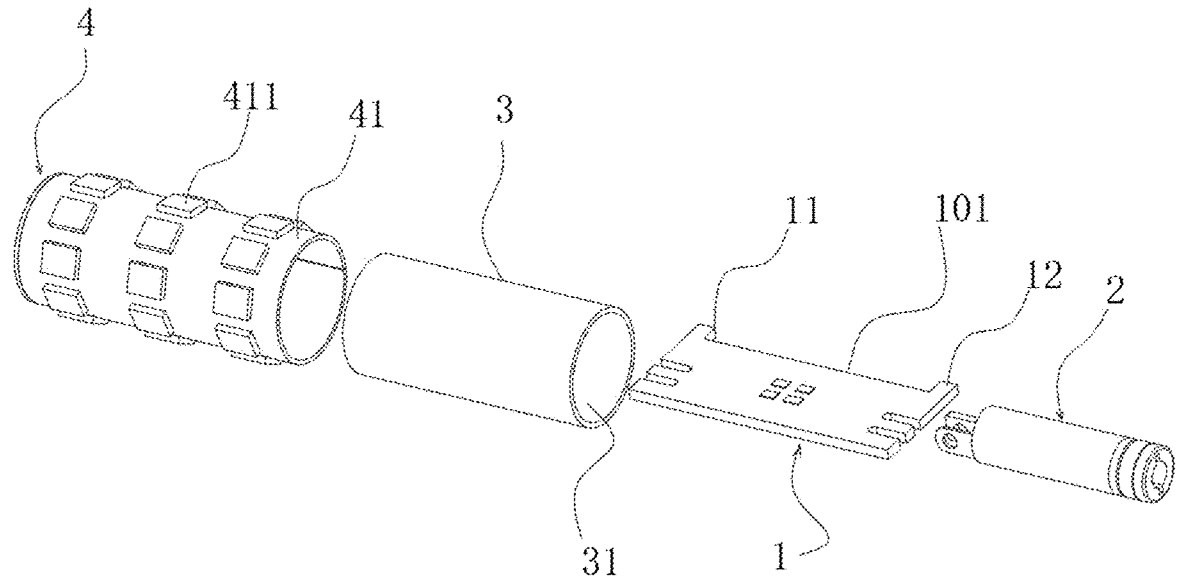
FIG. 5 is an exploded structure schematic diagram of the light-emitting body where the adapter connecting piece thereof comprises a second protrusion according to one embodiment of the present disclosure.
Figure 6:
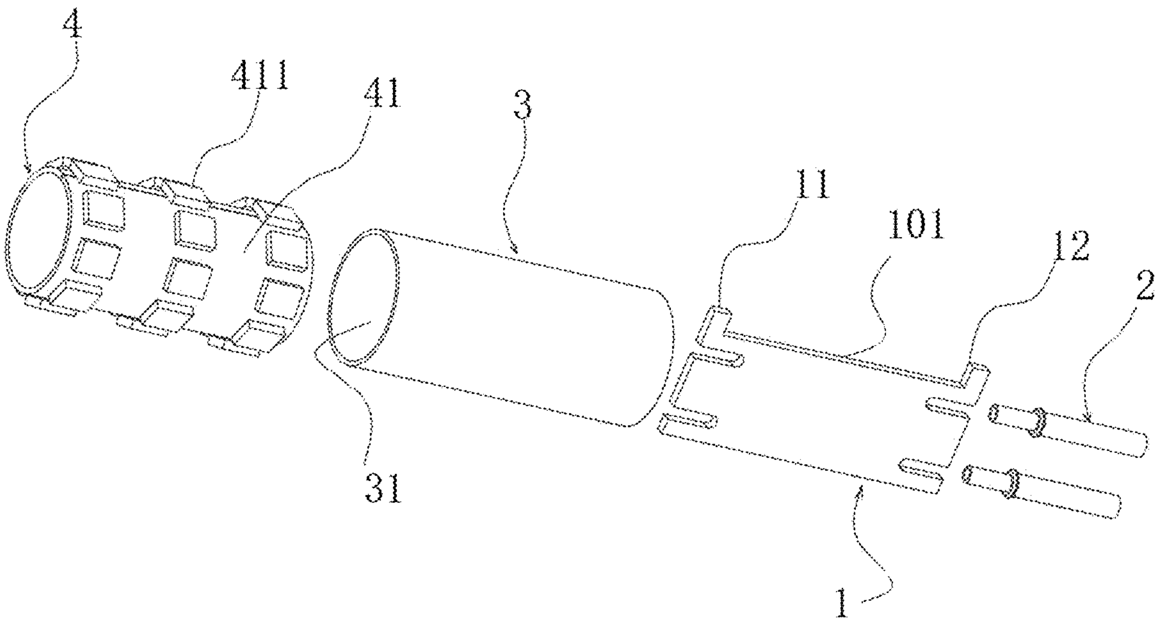
FIG. 6 is an exploded schematic diagram of the light-emitting body where the adapter connecting piece thereof comprises the second protrusion according to another embodiment of the present disclosure.

As shown in FIGS. 5 and 6, the first circuit structure 1 further comprises a second protrusion 12. At least one side of the adapter connecting piece 3 is clamped between the first protrusion 11 and the second protrusion 12. In this way, the adapter connecting piece 3 is conveniently fixed on the first circuit structure 1. In the embodiment, the first circuit structure 1 comprises the first protrusion 11 and the second protrusion 12, and one side of the adapter connecting piece 3 is clamped between the first protrusion 11 and the second protrusion 12. That is, the adapter connecting piece 3 is quickly fixed to the first circuit structure 1, front and rear ends of the adapter connecting piece 3 are limited and not easy to separate from the first circuit structure 1, and assembly efficiency is good. The light-emitting unit 4 is uniformly distributed on the adapter connecting piece 3, so light emitted by the light-emitting unit 4 is uniform. It is understood that the first circuit structure 1, as a power connecting piece, is allowed to be connected in series with other first circuit structures 1 to achieve electrical connection. In addition, the first circuit structure 1 comprises the first protrusion 11 and the second protrusion 12 to form at least one clamping groove 101. The at least one clamping groove 101 is configured to clamp the light-emitting unit 4, so the first protrusion 11 and the second protrusion 12 have various functions. For example, the at least one clamping groove 101 is U-shaped, which is not limited thereto. The first circuit structure 1 is served as a framework to support the power connector 2 when the power connector 2 is plugged into an external power source, so that the power connector 2 is stably plugged into an external power terminal. Further, the first circuit structure 1 clamps the adapter connecting piece 3 to support the adapter connecting piece 3, and the adapter connecting piece 3 evenly supports the light-emitting unit 4.

Figure 7:
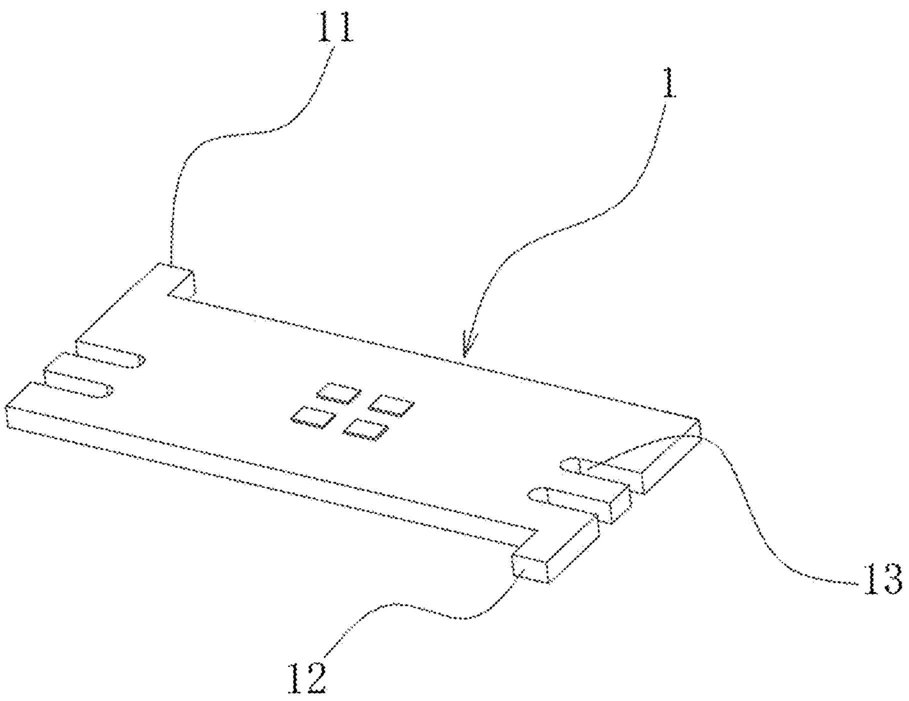
FIG. 7 is a structure schematic diagram of a first circuit structure according to one embodiment of the present disclosure where a first protrusion thereof and the second protrusion thereof are disposed on different sides of the first circuit structure.

As shown in FIGS. 5 and 6, in one embodiment, the adapter connecting piece 3 comprises a deformable piece. The deformable piece is integrally formed. In one embodiment, the adapter connecting piece 3 is of a ring structure and defines a cavity 31 penetrating through two ends of the adapter connecting piece 3. When the adapter connecting piece 3 is compressed, the cavity 31 is shaped into a flat-shaped cavity. When a width of the flat-shaped cavity is roughly equal to a width of the first circuit structure 1, the adapter connecting piece 3 is allowed to be sleeved on the first circuit structure 1. When the adapter connecting piece 3 resets, the at least one side of the adapter connecting piece 3 is clamped between the first protrusion 11 and the second protrusion 12. In one embodiment, the adapter connecting piece 3 is clamped in the first circuit structure 1 after elastic deformation and reset. In another embodiment, an inner diameter of the adapter connecting piece 3 after elastic deformation and reset is equal to the width of the first circuit structure 1, which ensures that at least one side of the adapter connecting piece 3 is clamped between the first protrusion 11 and the second protrusion 12. In one embodiment, the adapter connecting piece 3 is made of soft plastic, and the adapter connecting piece 3 is a circular cylinder, a square cylinder, or an elliptical cylinder, which is not limited thereto. As shown in FIGS. 5 and 6, in one embodiment, the first protrusion 11 and the second protrusion 12 are disposed on a same side of the first circuit structure 1 or on different sides of the first circuit structure 1 (as shown in FIG. 7). Alternatively, first protrusions 11 and second protrusions 12 are disposed on two sides of the first circuit structure 1. Optionally, one first protrusion 11 and one second protrusion 12 are disposed on one side of the first circuit structure 1 for further illustration.

The first protrusion 11 and the second protrusion 12 extend radially along the adapter connecting piece 3 that is cylindrical, so one clamping groove 101 is formed between the first protrusion 11 and the second protrusion 12 (as shown in FIGS. 5 and 6). The first protrusion 11 and the second protrusion 12 stably clamp and support the at least one side of the adapter connecting piece 3. The first protrusion 11 and the second protrusion 12 are respectively electrically connected to a positive electrode and a negative electrode of the light-emitting unit 4. Since the adapter connecting piece 3 is deformable, the adapter connecting piece 3 is quickly fixed to the first circuit structure 1, which is simple to operate and has high assembly efficiency. It should be noted that the first protrusion 11 and the second protrusion 12 are served as fixing positions of two ends of a second circuit structure 41, and the first protrusion 11 and the second protrusion 12 are served as electrical connecting positions of a positive electrode and a negative electrode of the second circuit structure 41. Therefore, there is no need to connect additional wire to the first circuit structure 1, which avoids an accumulation of the additional wire in the adapter connecting piece 3, making the light-emitting body 10 more streamlined and beautiful, and making assembly efficiency higher. In particular, the second circuit structure 41 is flexible and is wound around the adapter connecting piece 3, and the second circuit structure 41 is bonded to the adapter connecting piece 3 by adhesive. Because the adapter connecting piece 3 rigidly supports the second circuit board 41, the second circuit structure 41 is enabled to be fixed on the adapter connecting piece 3, thereby realizing 360-degree luminescence of the light-emitting body 10.

Figure 8:
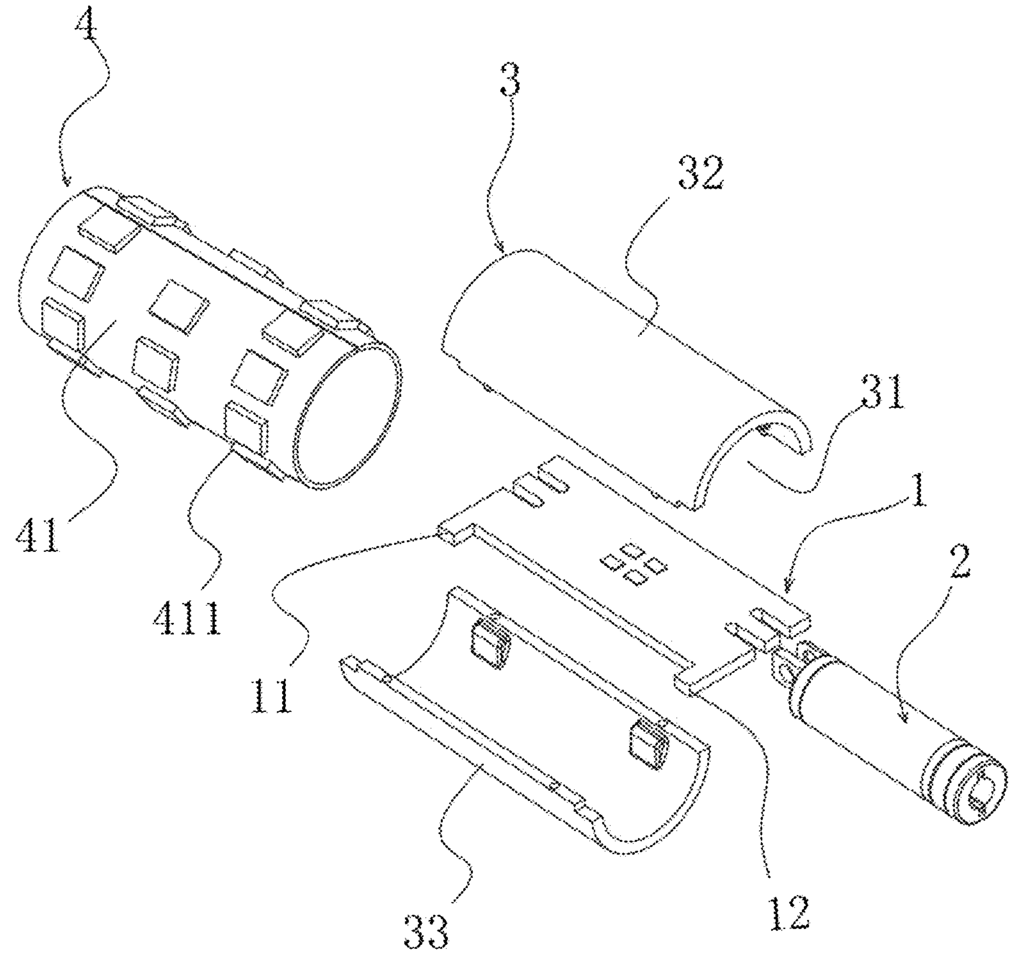
FIG. 8 is an exploded schematic diagram of the light-emitting body according to one embodiment of the present disclosure where a first hinge and a second hinge thereof are assembled to form the adapter connecting piece.

In one embodiment, as shown in FIG. 8, the adapter connecting piece 3 further comprises a first hinge 32 and a second hinge 33, the first hinge 32 and the second hinge 33 are detachably connected, and the first hinge 32 and the second hinge 33 are clamped on the first circuit structure 1. After the first hinge 32 and the second hinge 33 are connected together, at least one side thereof is clamped between the first protrusion 11 and the second protrusion 12. A connection method of the first hinge 32 and the second hinge 33 may be, but is not limited to, one or any combination of snap connection, bolt fixation or adhesive fixation.

As shown in FIGS. 3, 5, 6, and 8, in the embodiment, the lamp beads 411 are disposed on the second circuit structure 41. The second circuit structure 41 covers on the outer side of the adapter connecting piece 3, and the second circuit structure 41 is electrically connected to at least one of the first protrusion 11 and the second protrusion 12. It should be added that the second circuit structure 41 of the embodiment is preferably the flexible circuit board. The flexible circuit board refers to a highly reliable and flexible printed circuit board made of polyimide or polyester film as a substrate. The second circuit structure 41 is bent around the adapter connecting piece 3, and a shape of the adapter connecting piece 3 is fitted to cover the adapter connecting piece 3. Optionally, in the embodiment, when the second circuit structure 41 is electrically connected to the first protrusion 11 and the second protrusion 12, a positive electrode and a negative electrode is disposed on a head end of the second circuit structure 41, and the positive electrode and the negative electrode of the second circuit structure 41 are respectively electrically connected to a first side of the first protrusion 11 and a first side of the second protrusion 12. In one alternative embodiment, the positive electrode and the negative electrode are respectively disposed on two sides of a tail end of the second circuit structure 41, and the positive electrode and the negative electrode of the second circuit structure 41 are respectively connected to a second side of the first protrusion 11 and a second side of the second protrusion 12. In another alternative embodiment, the positive electrode of the second circuit structure 41 is disposed at one of the head end and the tail end of the second circuit structure 41, and the negative electrode of the second circuit structure 41 is disposed at the other one of the head end and the tail end of the second circuit structure 41, and the positive electrode and the negative electrode of the second circuit structure 41 are respectively connected to one side of the first protrusion 11 or one side of the second protrusion 12 to realize electrical connection.

Figure 9:
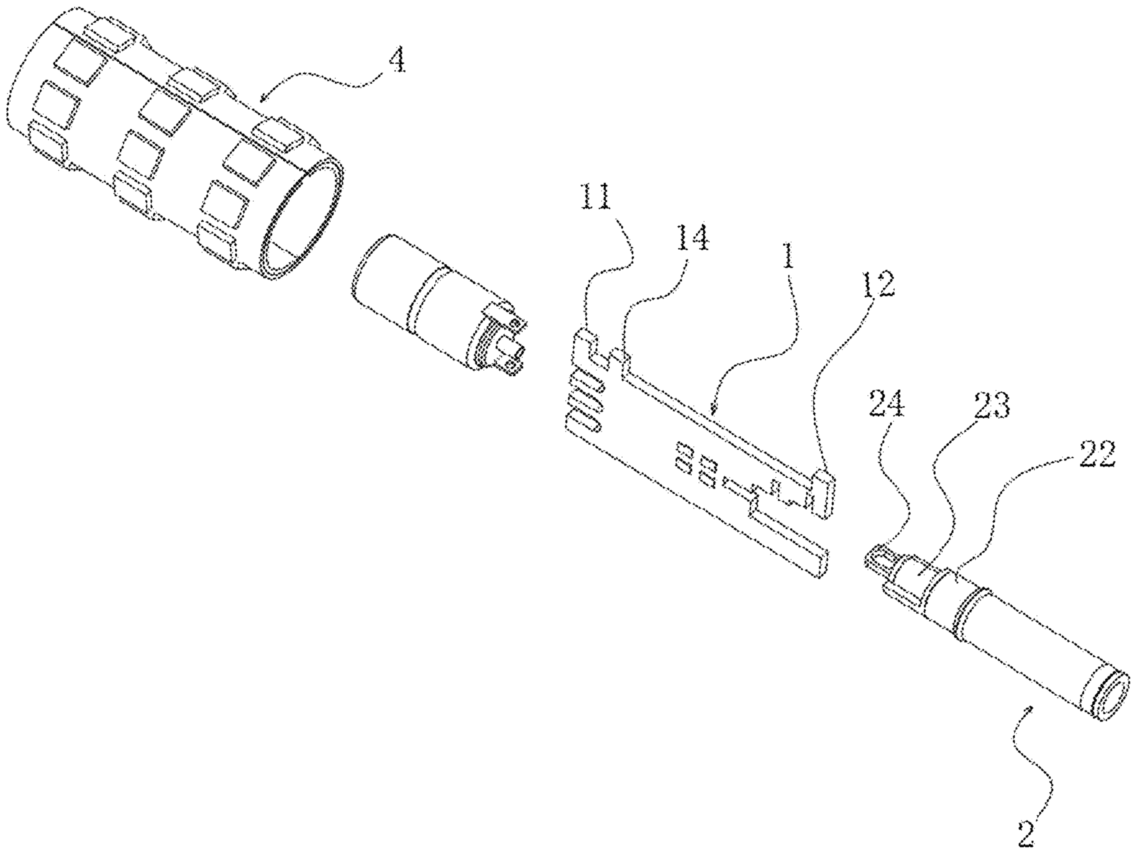
FIG. 9 is an exploded schematic diagram of the light-emitting body according to one embodiment of the present disclosure where an power connector thereof comprises a control signal access terminal.

In one embodiment, as shown in FIG. 9, the power connector 2 comprises a positive access terminal 22, a negative access terminal 23, and a control signal access terminal 24. The control signal access terminal 24 is configured to transmit a signal for controlling a color of the light-emitting unit 4. The control signal access terminal 24 is electrically connected to the first circuit structure 1. A third protrusion 14 is correspondingly disposed on the first circuit structure 1 as a control signal output terminal connected to the second circuit structure 41. It should be noted that the first protrusion 11 and the second protrusion 12 are respectively connected to the positive electrode and the negative electrode of the second circuit structure 41, and the third protrusion 14 is connected to the second circuit structure 41 to control the color of the light-emitting unit. Similarly, in order to realize a red green blue warm white (RGBWW) fantasy effect or 5-channel connection of digital multiplex (DMX). A fourth protrusion and a fifth protrusion may be provided. As shown in FIG. 9, in one embodiment, the power connector 2 comprises a circular plug 21, and the positive access terminal 22 and the negative access terminal 23 of the circular plug 21 are disposed along an axial direction of the circular plug 21. In one embodiment, the positive access terminal 22, the negative access terminal 23, and the control signal access terminal 24 are disposed along the axial direction of the circular plug 21. It should be noted that the control signal access terminal 24 is able to transmit the signal for controlling the color in addition to realizing the electrical connection, and the control signal access terminal 24 is disposed on the circular plug 21. After one light-emitting body 10 is plugged into another light-emitting body 10, each control signal access terminal 24 still maintains connection with a corresponding first circuit structure 1. Moreover, each two adjacent circular plugs 21 are connected in parallel, so when the light-emitting bodies 10 are connected together, the light-emitting bodies 1 are also connected in parallel, and a circuit thereof is simple. Optionally, the circular plug 21 is selected from a direct current (DC) plug, a cannon X Series with latch and rubber compound (XLR) plug or a deutsches institut für normung standard (DIN) plug.

Figure 10:
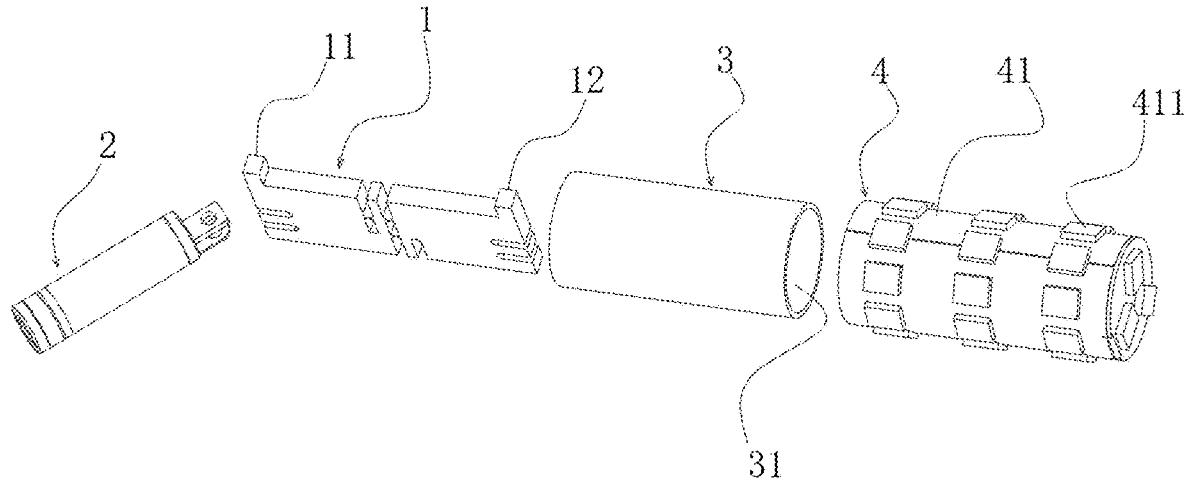
FIG. 10 is an exploded schematic diagram of the light-emitting body according to one embodiment of the present disclosure where a circular plug thereof is tiltedly disposed on the first circuit structure.
Figure 11:
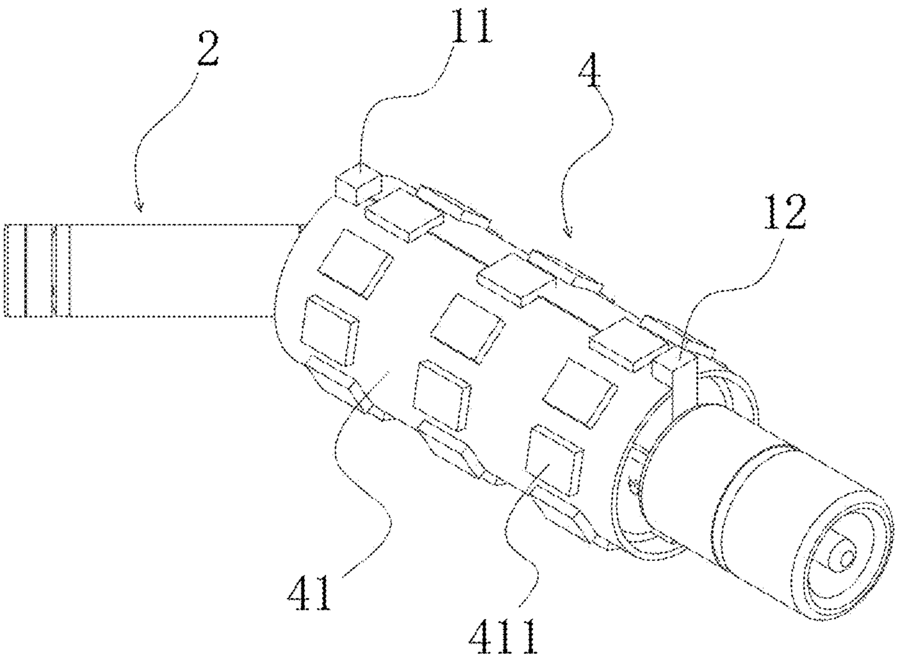
FIG. 11 is a structural schematic diagram of the light-emitting body according to one embodiment of the present disclosure where the circular plug thereof is tiltedly disposed on the first circuit structure.
Figure 12:
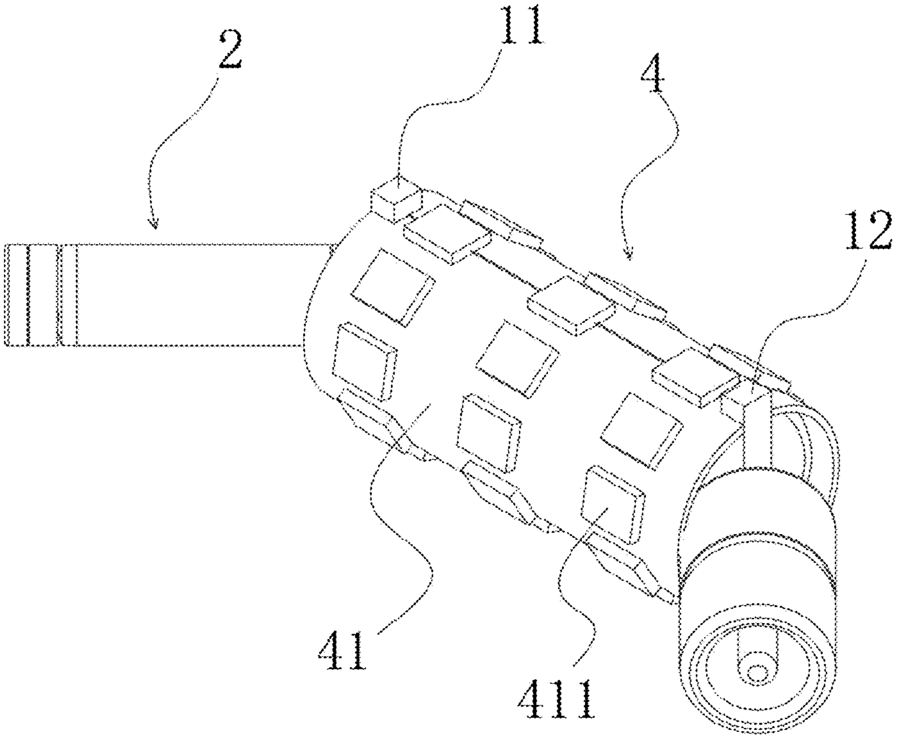
FIG. 12 is an exploded schematic diagram of the light-emitting body according to one embodiment of the present disclosure where a first plug and a second plug is tiltedly disposed on the first circuit structure.

In one embodiment, as shown in FIGS. 10-12, each of the power connectors is disposed at a predetermined angle, and the predetermined angle is in a range of 0-180 degrees. In one embodiment, the circular plug 21 is a plug extending straight out and parallel to the first circuit structure 1 (as shown in FIG. 9). In another embodiment, circular plugs 21 extend out at a certain angle to the first circuit structure 1 (as shown in FIGS. 10-12), and each of the circular plugs 21 extends out at 30 degrees from an end face of the first circuit structure 1. In some embodiments, the circular plug 21 may extend out at 45 degrees or 60 degrees from the end face of the first circuit structure 1, and the predetermined angle may be determined according to needs of assembling a lamp extended in multiple dimensions.

Figure 13:
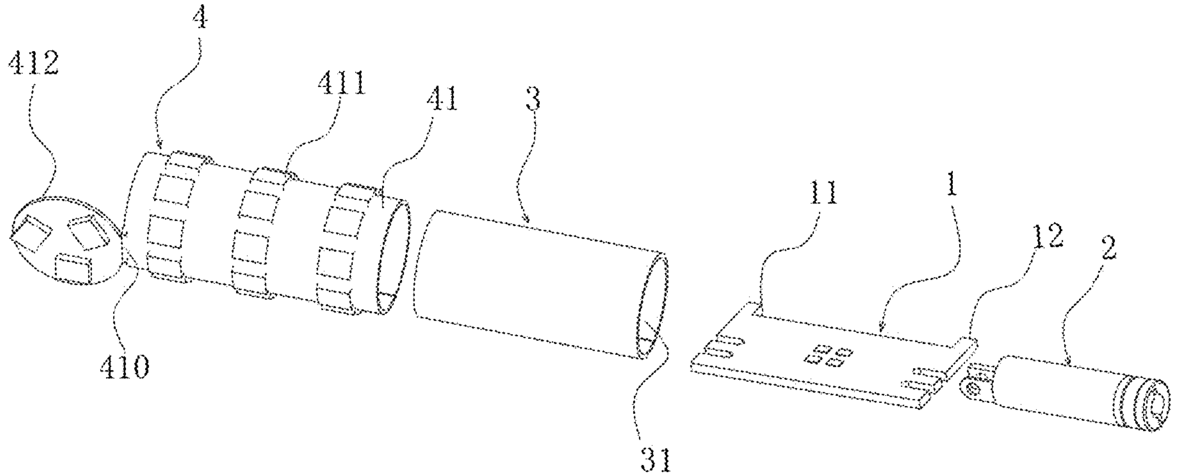
FIG. 13 is an exploded schematic diagram of the light-emitting body according to one embodiment of the present disclosure where a second circuit structure thereof comprises a first extension portion.
Figure 14:
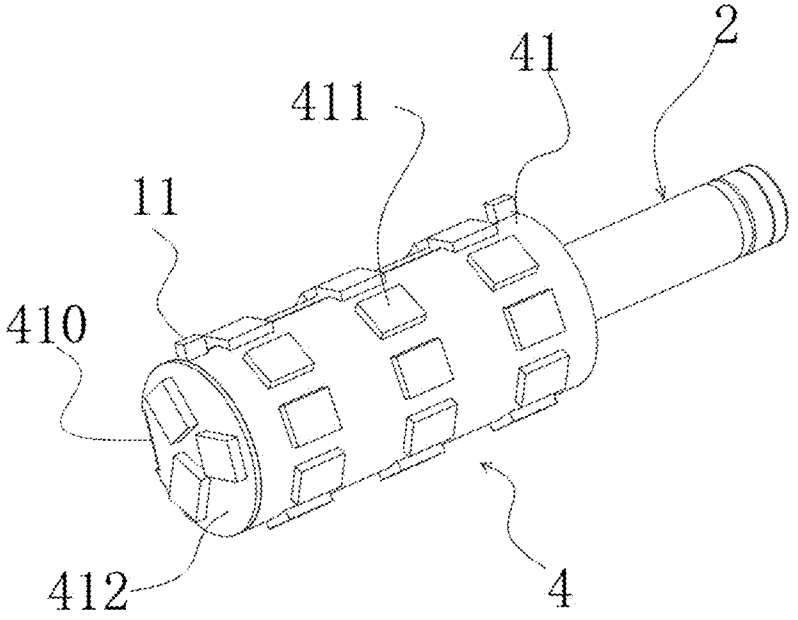
FIG. 14 is a structural schematic diagram of the light-emitting body according to one embodiment of the present disclosure where the second circuit structure thereof comprises the first extension portion.

In one embodiment, as shown in FIGS. 13-14, the second circuit structure 41 further comprises a first extension portion 412. The lamp beads 411 are disposed on the first extension portion 412. A shape of the first extension portion 412 is matched with an opening defined on a first end of the cavity 31 of the adapter connecting piece 3. The first extension portion 412 is connected to the opening defined on the first end of the cavity 31. The power connector 2 extends out of the adapter connecting piece 3 from an opening defined a second end of the cavity 31.

In one embodiment, the second circuit structure 41 further comprises a bending portion 410 connected to the first extension portion 412, and the first extension portion 412 is bent and covers on the opening of the first end of the cavity 31 through the bending portion 410. It should be noted that the light-emitting body 10 is served as an independent lamp body or a light-emitting body 10 disposed on a tail end of lamps connected in series.

Figure 15:
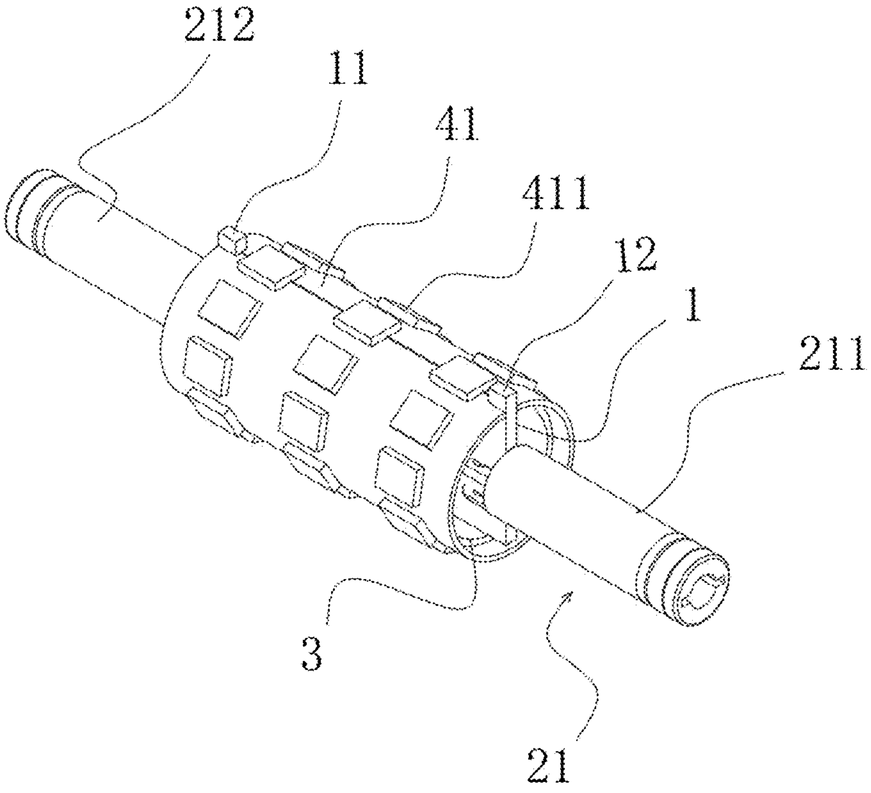
FIG. 15 is a structural schematic diagram of the light-emitting body according to one embodiment of the present disclosure where the first plug and the second plug thereof are respectively disposed on two ends of the light-emitting body.
Figure 16:
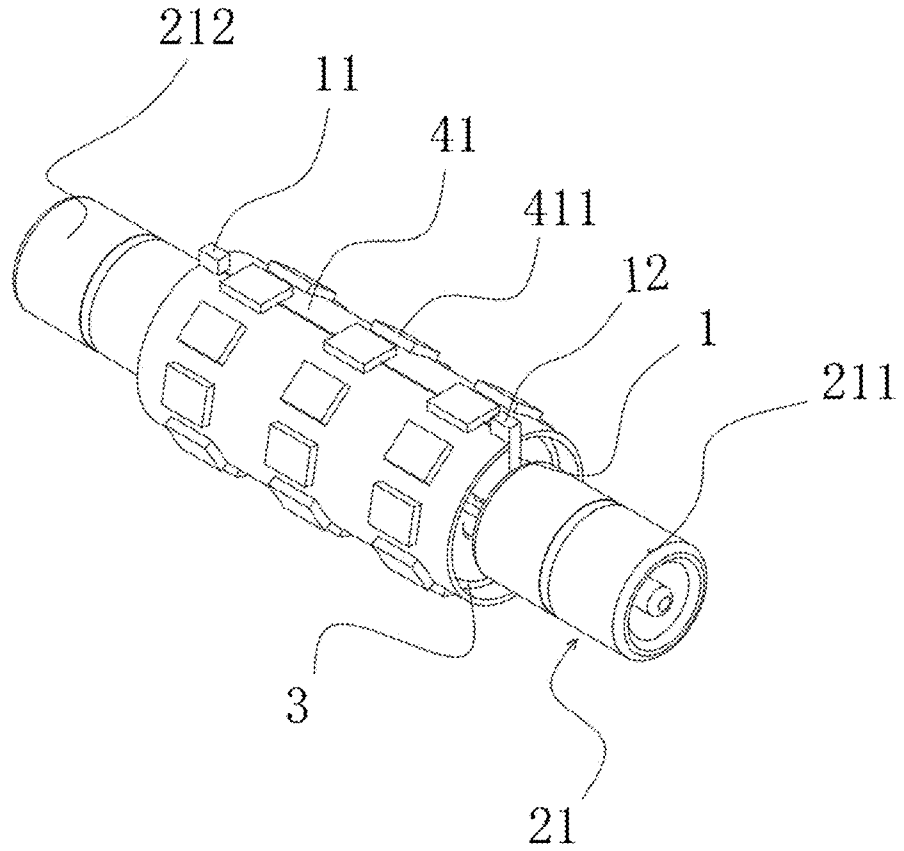
FIG. 16 is a structural schematic diagram of the light-emitting body according to another embodiment of the present disclosure where the first plug and the second plug thereof are respectively disposed on two ends of the light-emitting body.

In one embodiment, as shown in FIGS. 15-16, the power connectors 2 comprise circular plugs 21 for plugging. The circular plugs 21 comprise a first plug 211 and a second plug 212. The first plug 211 and the second plug 212 respectively extend out of openings on two ends of the cavity 31. An extended portion of the first plug 211 and an extended portion of the second plug 212 are served as connecting portion for plugging.

In one embodiment, as shown in FIGS. 17-21, the circular plugs 21 further comprise a third plug 213 connected to the first circuit structure 1. The third plug 213 is disposed perpendicular to the first plug 211 or the second plug 212. The first circuit structure is disposed on two sides of the third plug. Adapter connecting pieces 3 are disposed on two sides of the first circuit structure 1. A through hole 413 is defined on a middle portion of the second circuit structure 41. The through hole 413 is matched with the third plug 213. When the second circuit structure 41 is covered on the adapter connecting pieces, the third plug 213 passes through the through hole 413.

Figure 17:
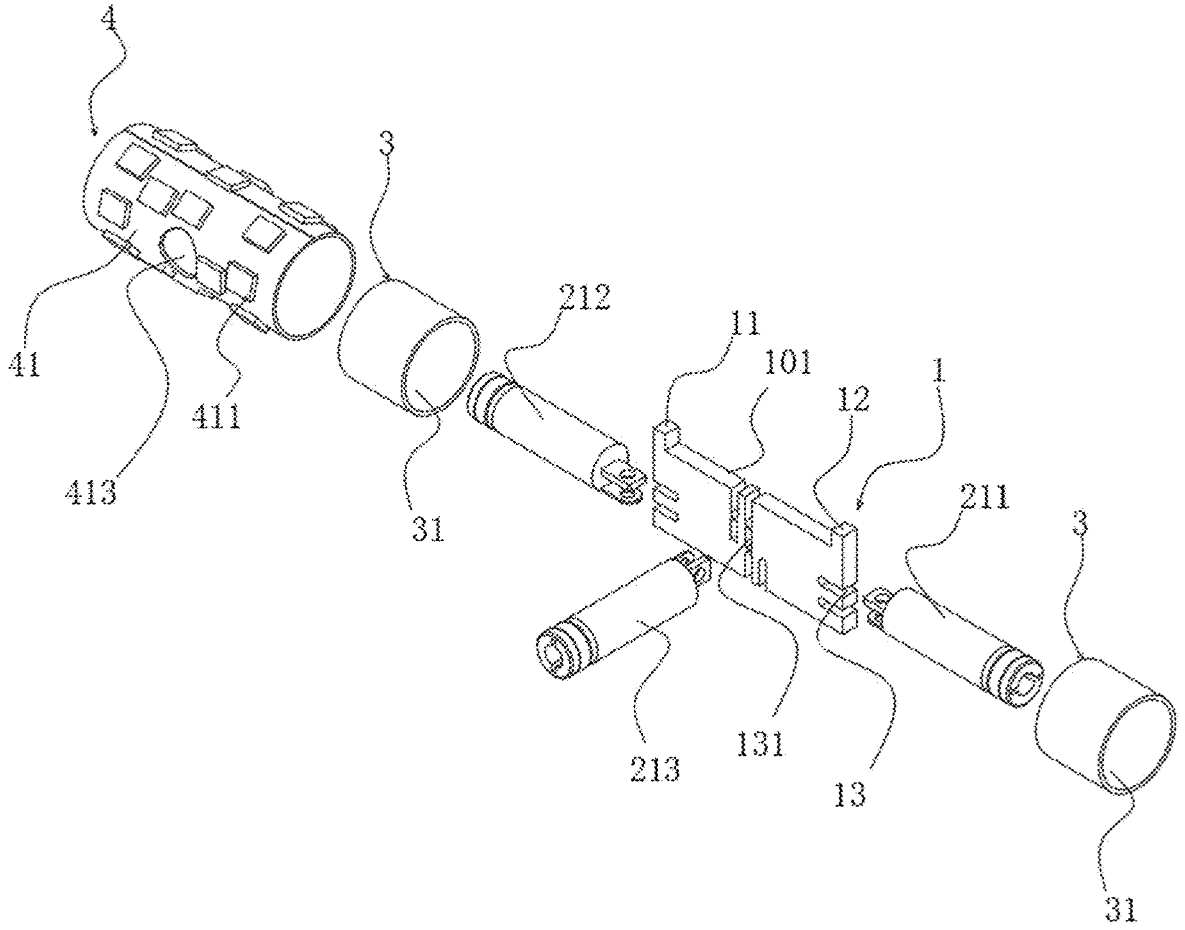
FIG. 17 is an exploded schematic diagram of the light-emitting body according to one embodiment of the present disclosure where a third plug thereof is disposed on the first circuit board.
Figure 18:
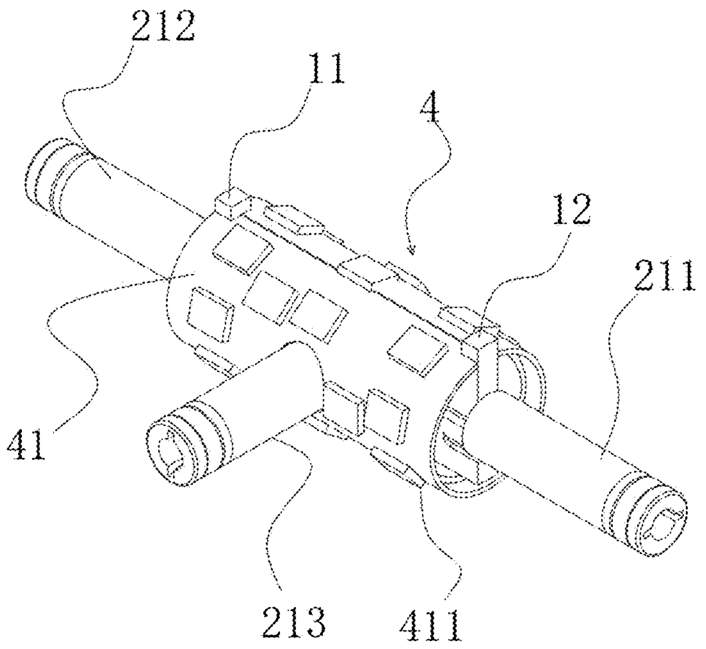
FIG. 18 is a structural schematic diagram of the light-emitting body according to one embodiment of the present disclosure where the light-emitting body comprises the third plug.
Figure 19:
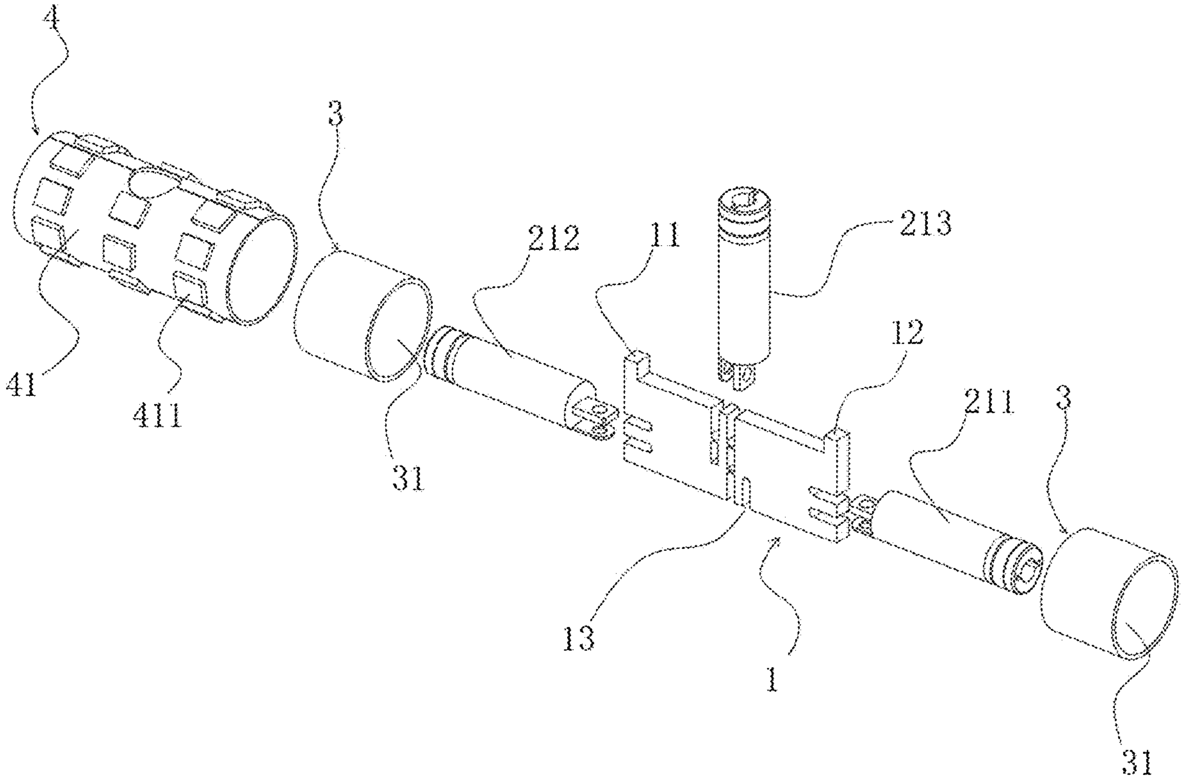
FIG. 19 is an exploded schematic diagram of the light-emitting body according to another embodiment of the present disclosure where the third plug thereof is disposed on the first circuit board.
Figure 20:
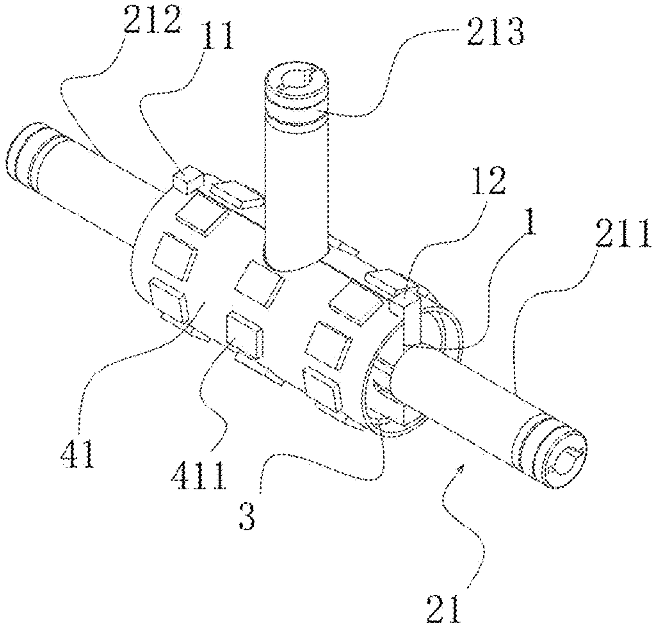
FIG. 20 is a structural schematic diagram of the light-emitting body according to another embodiment of the present disclosure where the light-emitting body comprises the third plug.
Figure 21:
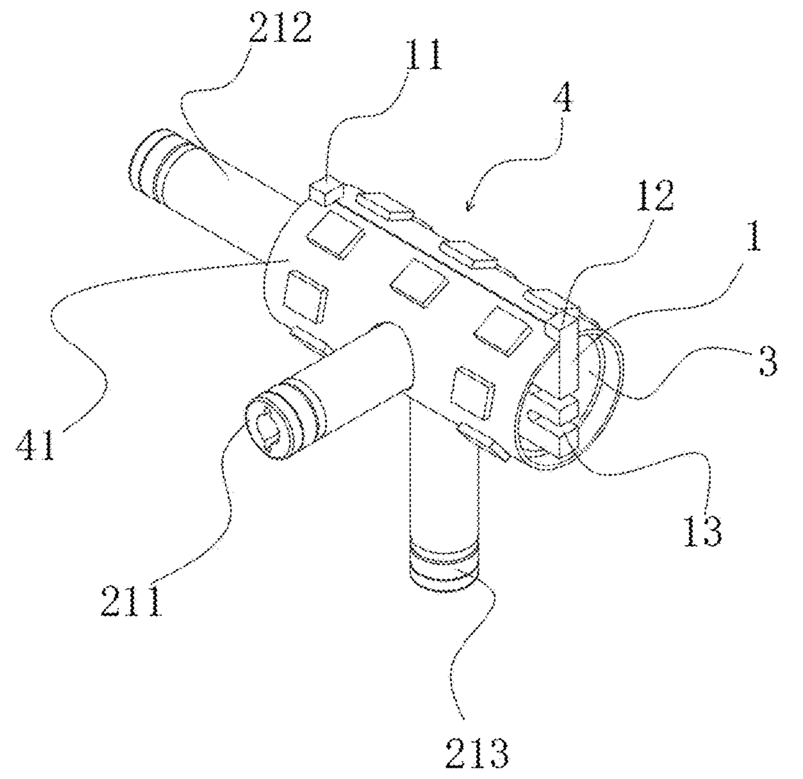
FIG. 21 is a structural schematic diagram of the light-emitting body according to another embodiment of the present disclosure where the light-emitting body comprises the third plug.

Specifically, as shown in FIG. 17, the first circuit structure 1 defines notches 13 matched with the first plug 211 and the second plug 212, and the power connectors 2 are respectively plug into the notches 13 and connected to the notched 113 by a fixed connection, such as welding, to achieve electrical connection. In one embodiment, the notches 13 comprises connecting notches 131 defined in a middle portion of the first circuit structure 1, and the third plug 213 is plugged into the connecting notches 131 and connected to the connecting notches 131 by the fixed connection, such as welding, to achieve electrical connection.

Figure 40:
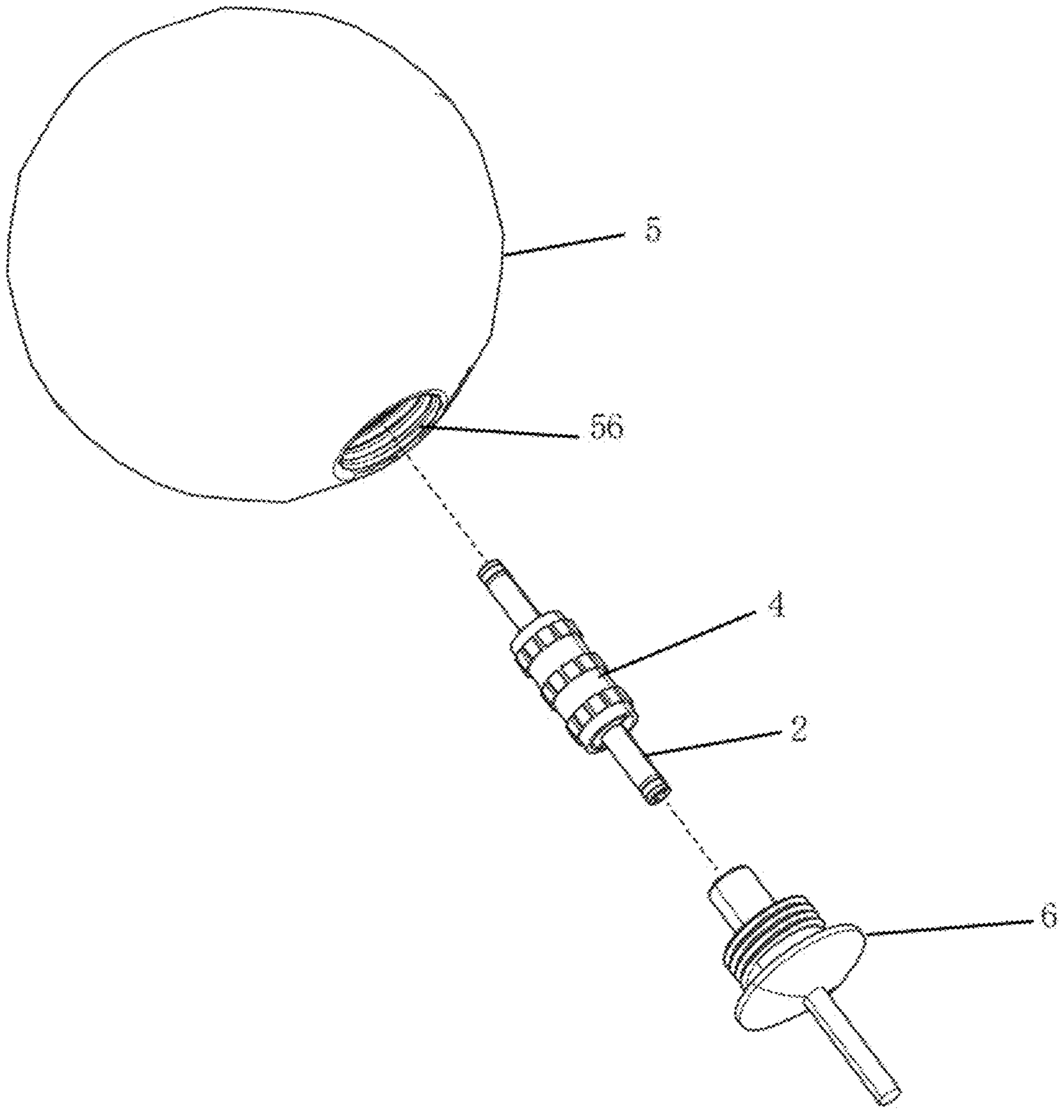
FIG. 40 is an exploded schematic diagram of a lamp according to one embodiment of the present disclosure where the light-emitting body is mounted in the lampshade through a power connecting terminal.

It should be noted that, by positioning and connecting the notches 13 with the circular plugs 21, center positions of the circular plugs 21 are corresponding to a center of the first circuit structure 1 in a thickness direction. That is, positions of the circular plugs 21 are opposite to the center of the first circuit structure 1, and a position of a mounting opening 56 of a lampshade 5 is better positioned (as shown in FIG. 40). When the circular plugs 21 are inserted into the mounting opening 56 through a wiring terminal 6, a center position of the wiring terminal 6 corresponds to center positions of the circular plug 21, and the center positions of the circular plugs 21 correspond to the center position of the mounting opening 56. That is, a center position of the adapter connecting piece 3 corresponds to the center position of the lampshade 5, so that the light of the light-emitting body 10 is evenly emitted at the center position of the lampshade 5.

Figure 22:
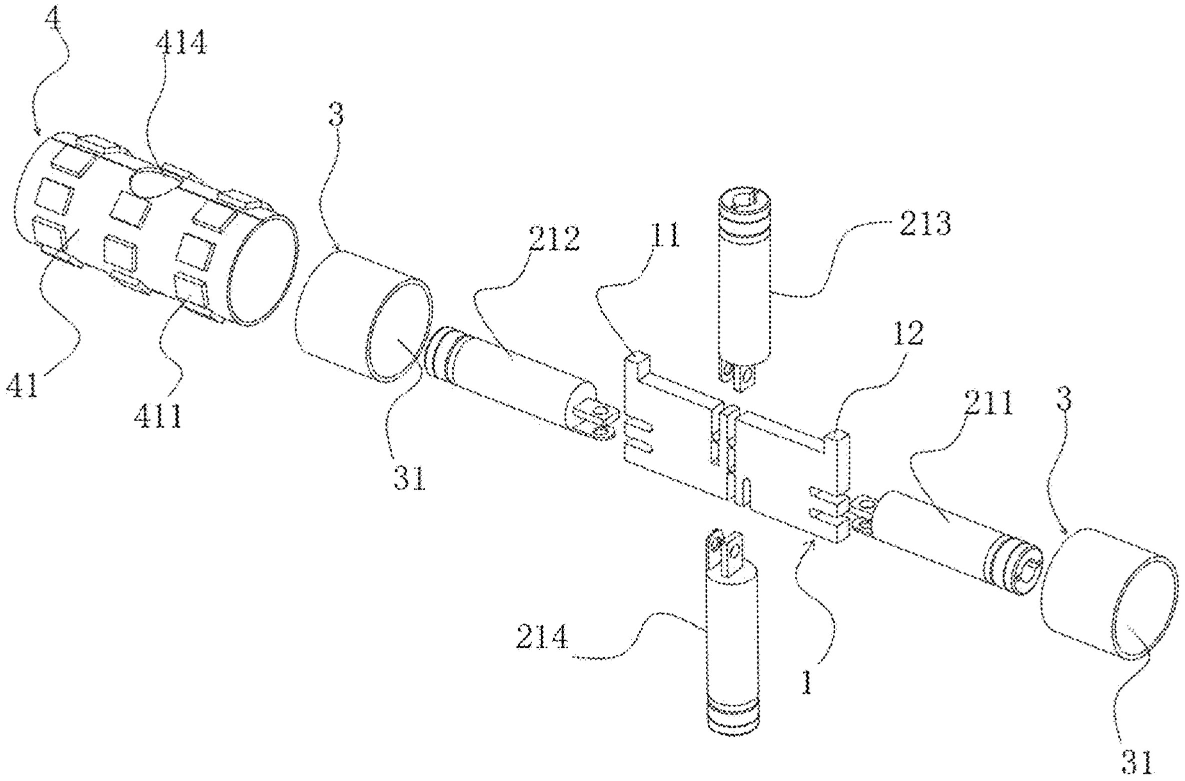
FIG. 22 is an exploded structural schematic diagram of the light-emitting body according to one embodiment of the present disclosure where the light-emitting body comprises a fourth plug.
Figure 23:
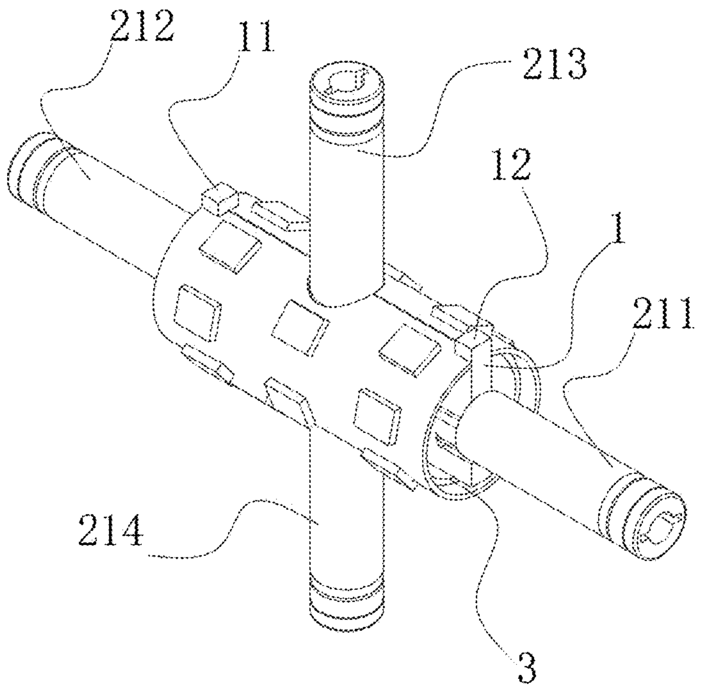
FIG. 23 is a structural schematic diagram of the light-emitting body according to one embodiment of the present disclosure where the light-emitting body comprises the fourth plug.
Figure 24:
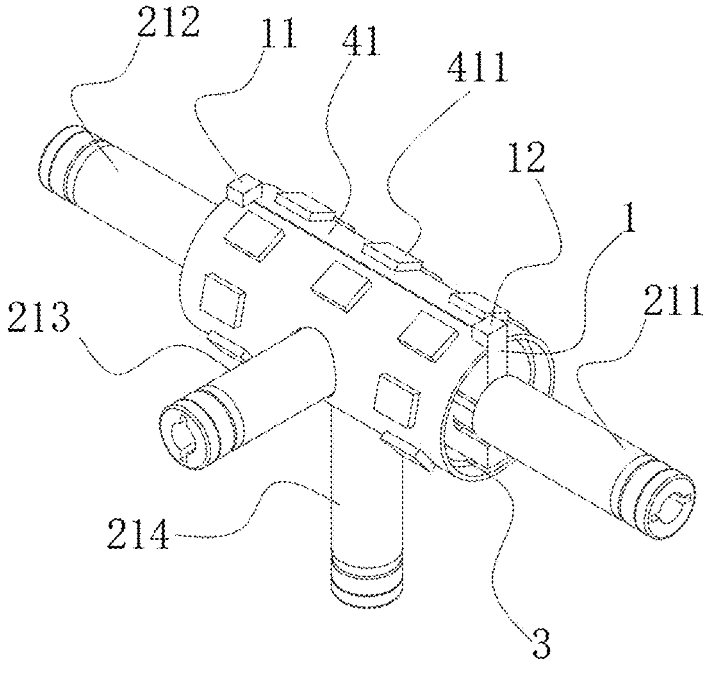
FIG. 24 is a structural schematic diagram of the light-emitting body according to another embodiment of the present disclosure where the light-emitting body comprises the fourth plug.
Figure 25:
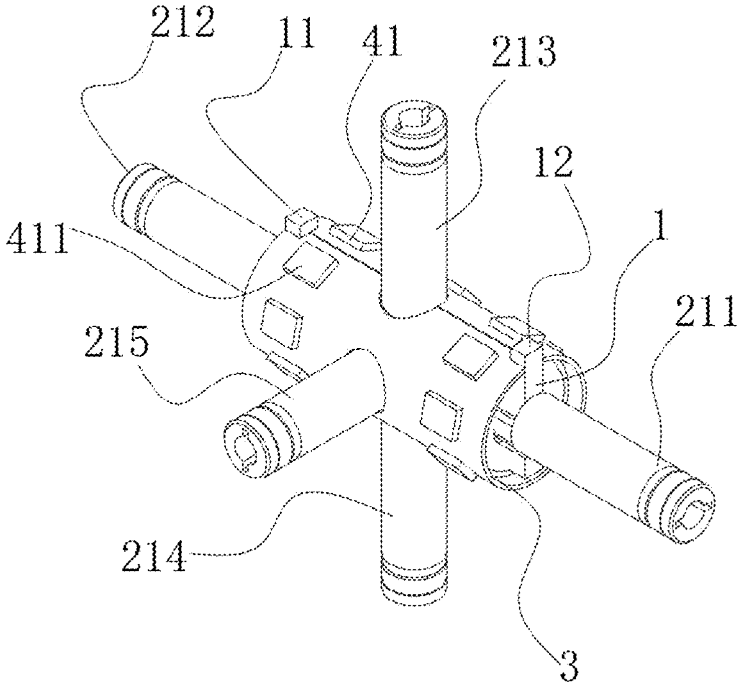
FIG. 25 is a structural schematic diagram of the light-emitting body according to one embodiment of the present disclosure where the light-emitting body comprises a fifth plug.
Figure 26:
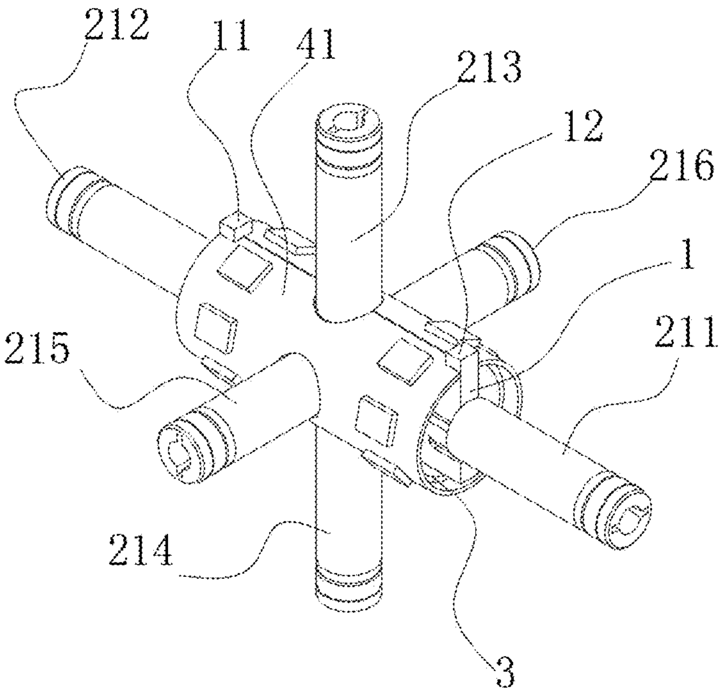
FIG. 26 is a structural schematic diagram of the light-emitting body according to one embodiment of the present disclosure where the light-emitting body comprises a sixth plug.

In one embodiment, as shown in FIGS. 22-24, the circular plugs 21 further comprise a fourth plug 214. The fourth plug 214 is disposed on the first circuit structure 1. The fourth plug 214 is disposed on a same side of the light-emitting body as the first protrusion 11 or the second protrusion 12. The third plug 213 and the fourth plug 214 are symmetrically disposed on the first circuit structure 1. Semicircular grooves 414 are respectively defined on the head end and the tail end of the second circuit structure 41. The fourth plug 214 is matched with any one of the semicircular grooves 414. Similarly, a fifth plug 215 (as shown in FIG. 25) and a sixth plug 216 (as shown in FIG. 26) may be disposed on the first circuit structure 1. The circular plugs 21 are distributed at different angles in different dimensions. The arrangement of the circular plugs 21 provides a feasible basis for the light-emitting bodies into lamps of different shapes. It should be noted that when mounting the second circuit structure 41, the through hole 413 of the second circuit structure 41 is first sleeved on the third plug 213, and the two ends of the second circuit structure 41 are respectively abut against the outer side of the adapter connecting piece 3 to ensure that the head end and the tail end of the second circuit structure 41 are respectively connected to the first protrusion 11 and the second protrusion 12. When the head end and the tail end of the second circuit structure 41 are respectively connected to the first protrusion 11 and the second protrusion 12, the two semicircular grooves 414 are connected to form a circular hole for the fourth plug 214 to pass through.

Figure 27:
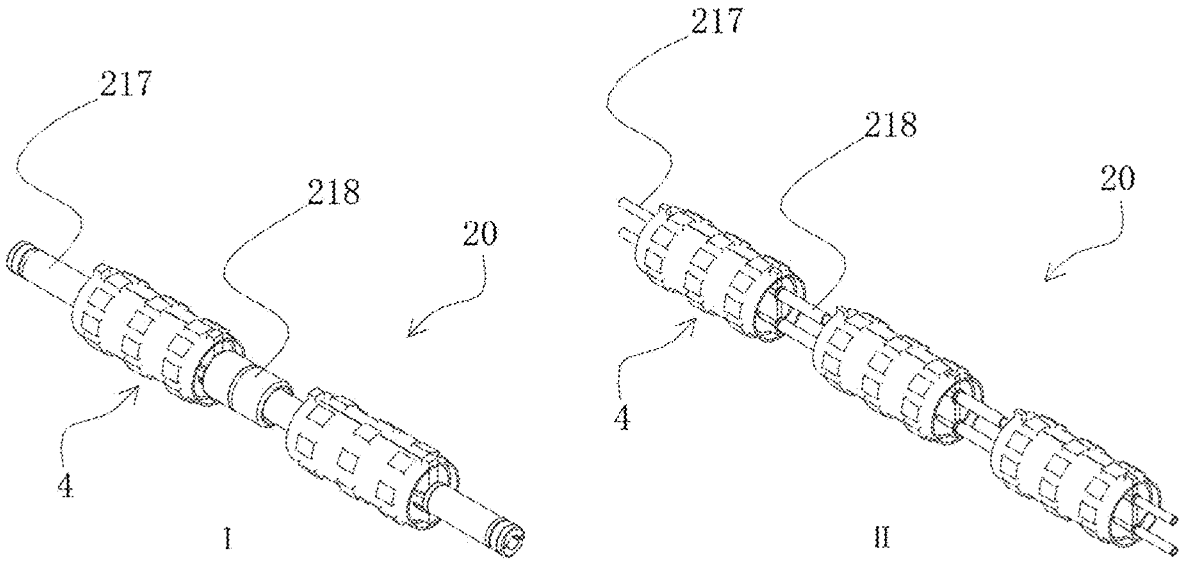
FIG. 27 is a structural schematic diagram of the light-emitting body module according to one embodiment of the present disclosure.
Figure 28:
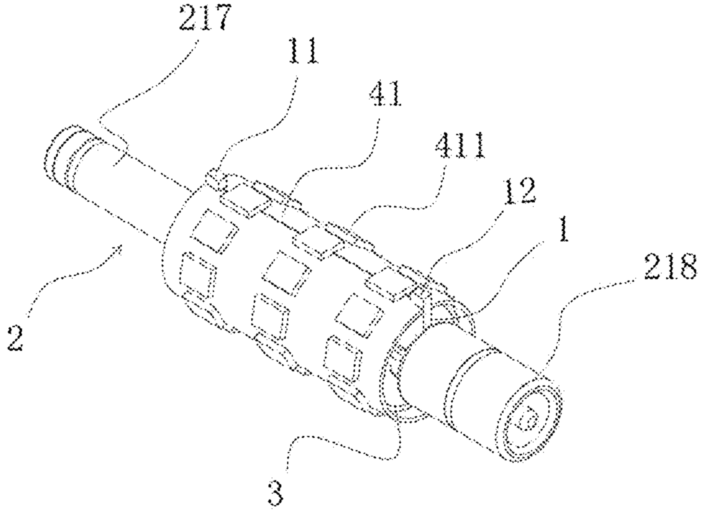
FIG. 28 is a structural schematic diagram of the light-emitting body according to one embodiment of the present disclosure where the light-emitting body comprises a female plug and a male plug.
Figure 29:
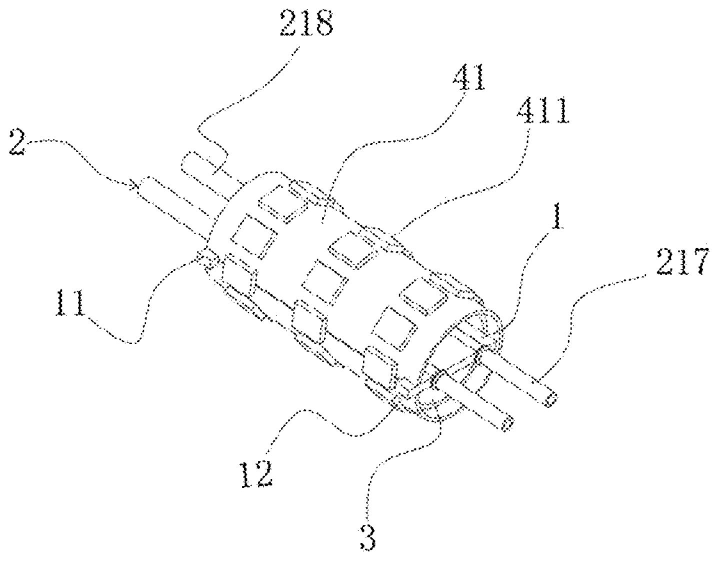
FIG. 29 is a structural schematic diagram of the light-emitting body according to another embodiment of the present disclosure where the light-emitting body comprises the female plug and the male plug.
Figure 30:
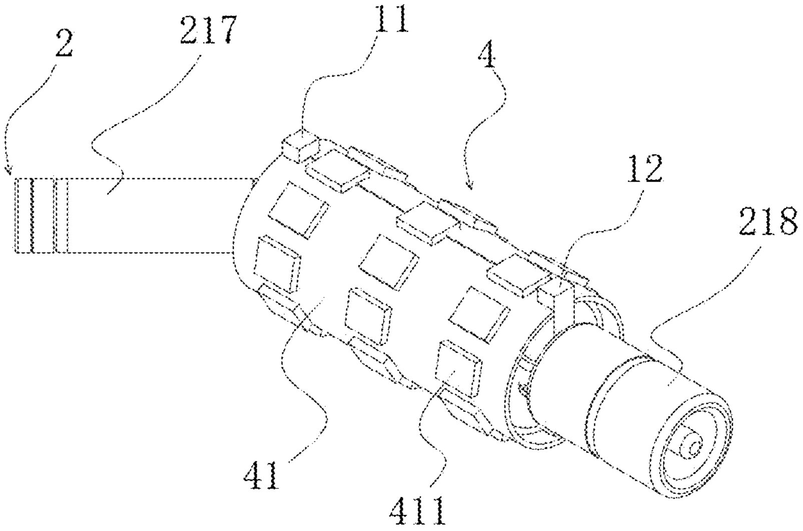
FIG. 30 is a structural schematic diagram of the light-emitting body according to another embodiment of the present disclosure where the light-emitting body comprises the female plug and the male plug.

As shown in FIG. 27, the present disclosure provides a light-emitting body module 20. The light-emitting body module 20 comprises more than two light-emitting bodies 10. Each two adjacent light-emitting bodies 10 are plugged with each other. Furthermore, as shown in FIGS. 28-30, the power connectors 2 comprise a male plug 217 and a female plug 218. The male plug 217 of each of the light-emitting bodies is configured to plug with the female plug 218 of an adjacent light-emitting body 2. The female plug 218 of each of the light-emitting bodies is configured to plug with the male plug 217 of another adjacent light-emitting body. Each two adjacent light-emitting bodies 10 are plugged with each other, so that the light-emitting bodies 10 are connected freely to shape into different shapes.

Figure 31:
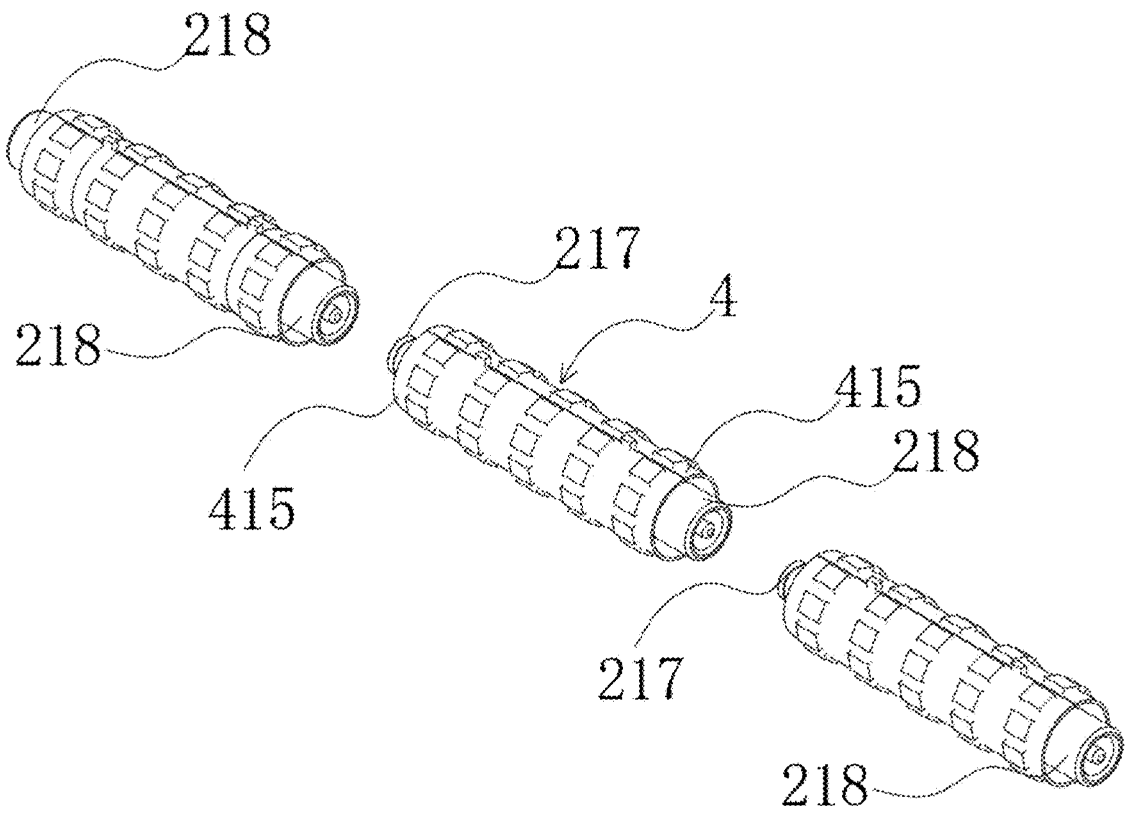
FIG. 31 is a structural schematic diagram of the light-emitting body according to one embodiment of the present disclosure where the light-emitting body comprises a second extension portion.
Figure 32:
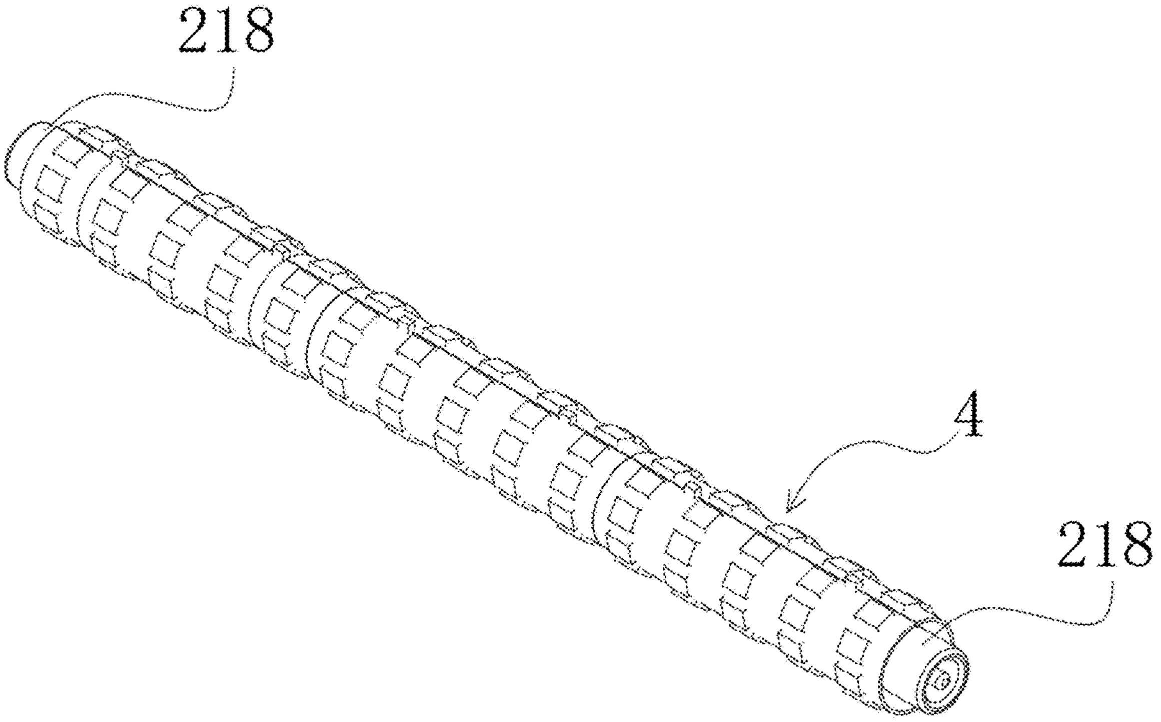
FIG. 32 is a structural schematic diagram of the light-emitting body module according to one embodiment of the present disclosure where each two adjacent second circuit structures are gaplessly connected.
Figure 33:
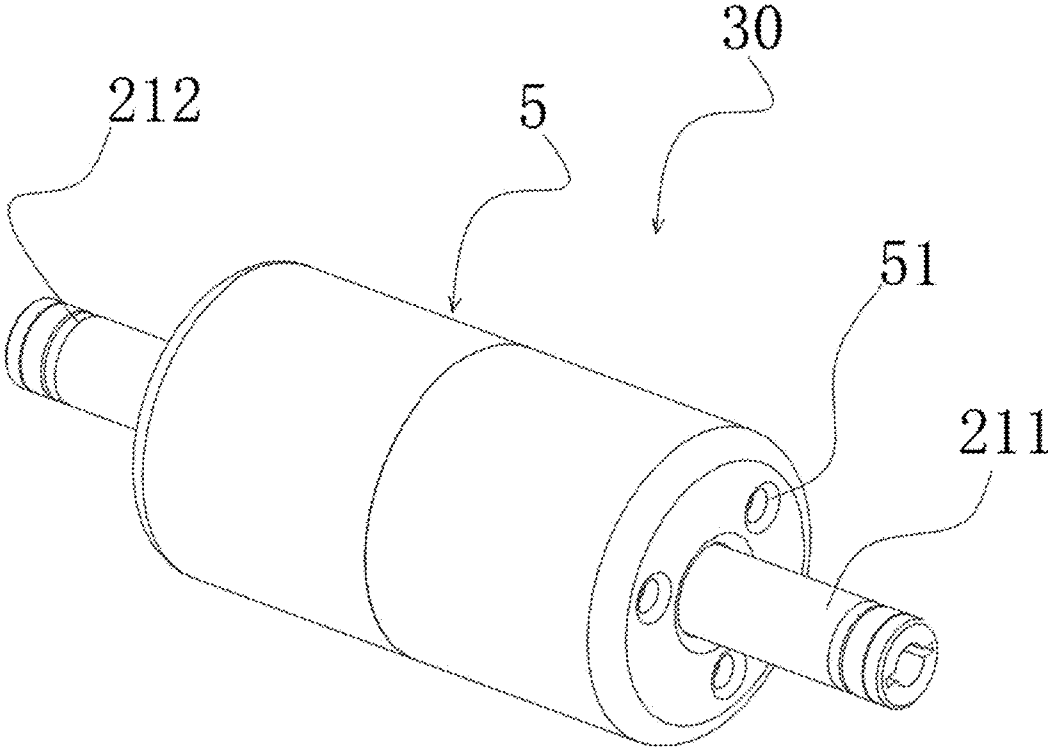
FIG. 33 is a structural schematic diagram of a lamp according to one embodiment of the present disclosure where the light-emitting body thereof is one lampshade and two circular plugs.
Figure 34:
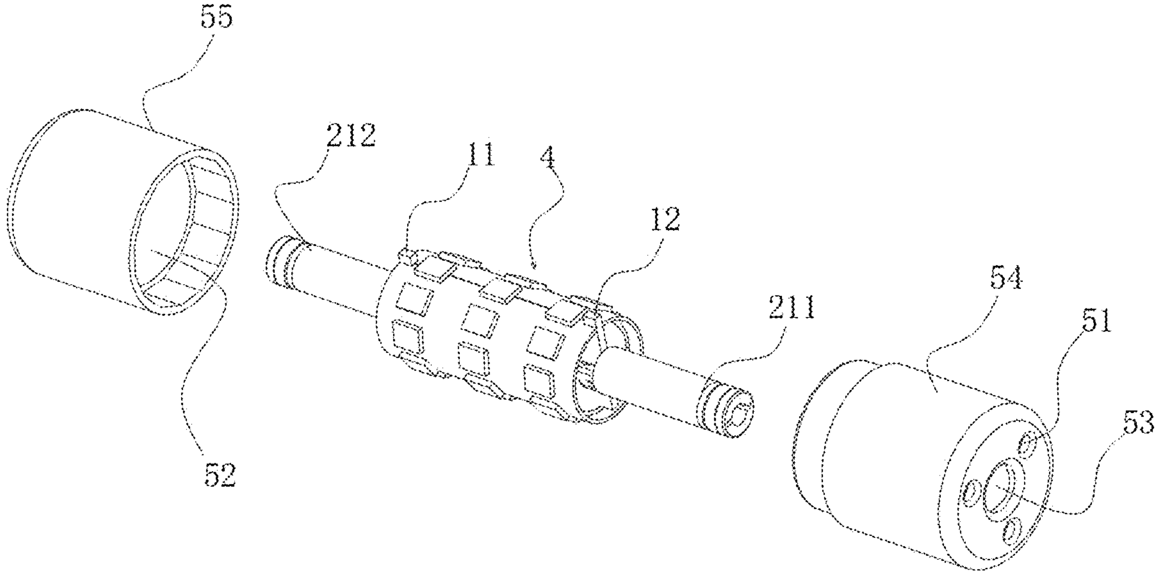
FIG. 34 is an exploded schematic diagram of the light-emitting body according to one embodiment of the present disclosure where the light-emitting body comprises one lampshade and two circular plugs.
Figure 35:
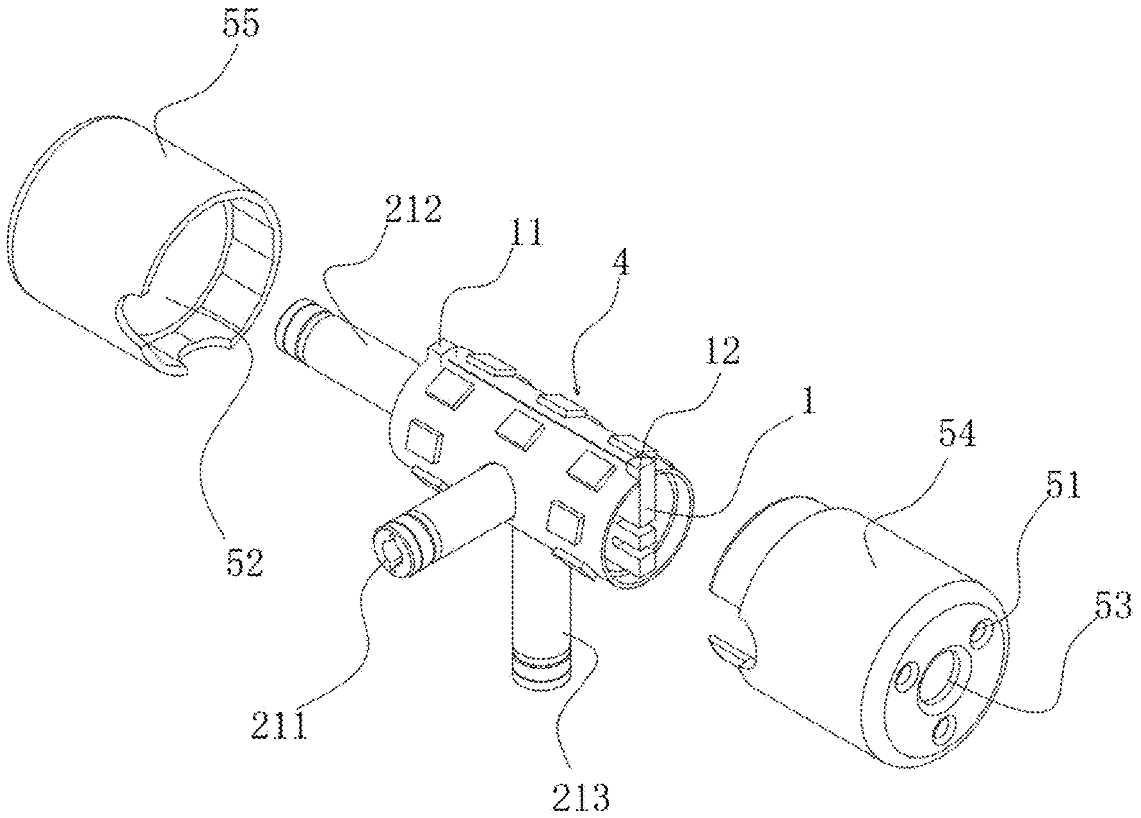
FIG. 35 is an exploded schematic diagram of the light-emitting body according to one embodiment of the present disclosure where the light-emitting body comprises one lampshade and three circular plugs.
Figure 36:
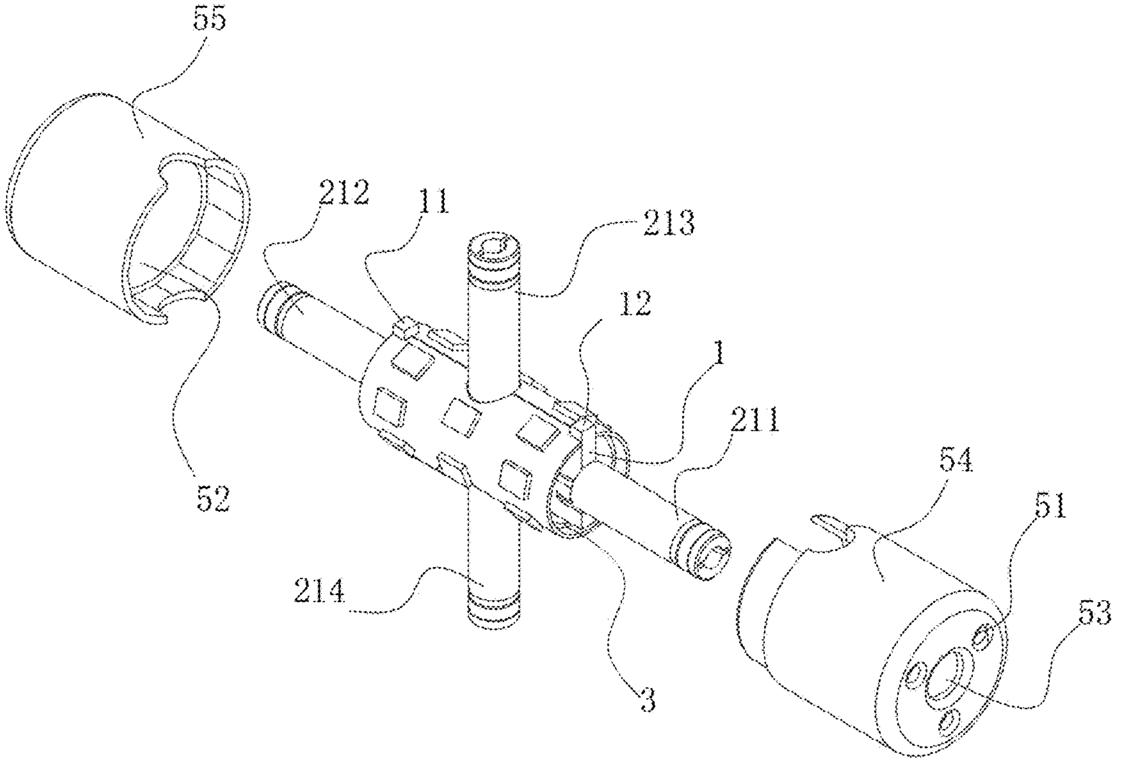
FIG. 36 is an exploded schematic diagram of the light-emitting body according to one embodiment of the present disclosure where the light-emitting body comprises one lampshade and four circular plugs.
Figure 37:
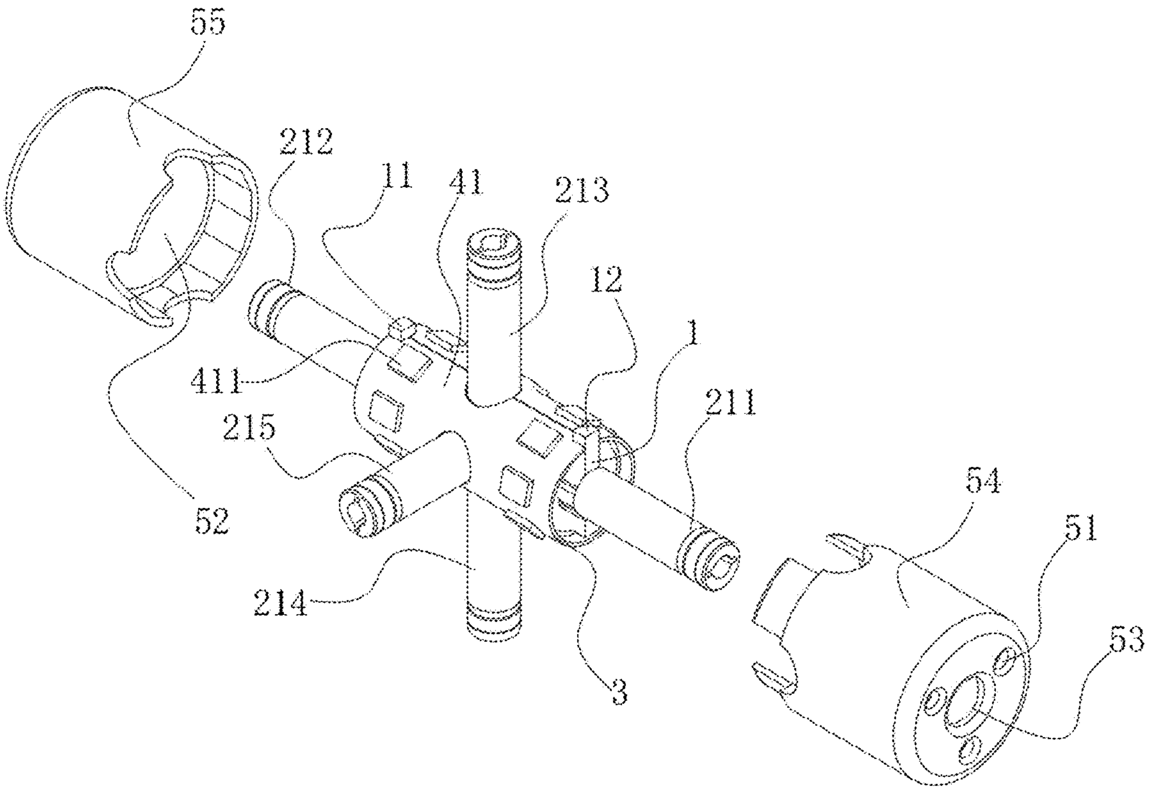
FIG. 37 is an exploded schematic diagram of the light-emitting body according to one embodiment of the present disclosure where the light-emitting body comprises one lampshade and five circular plugs.
Figure 38:
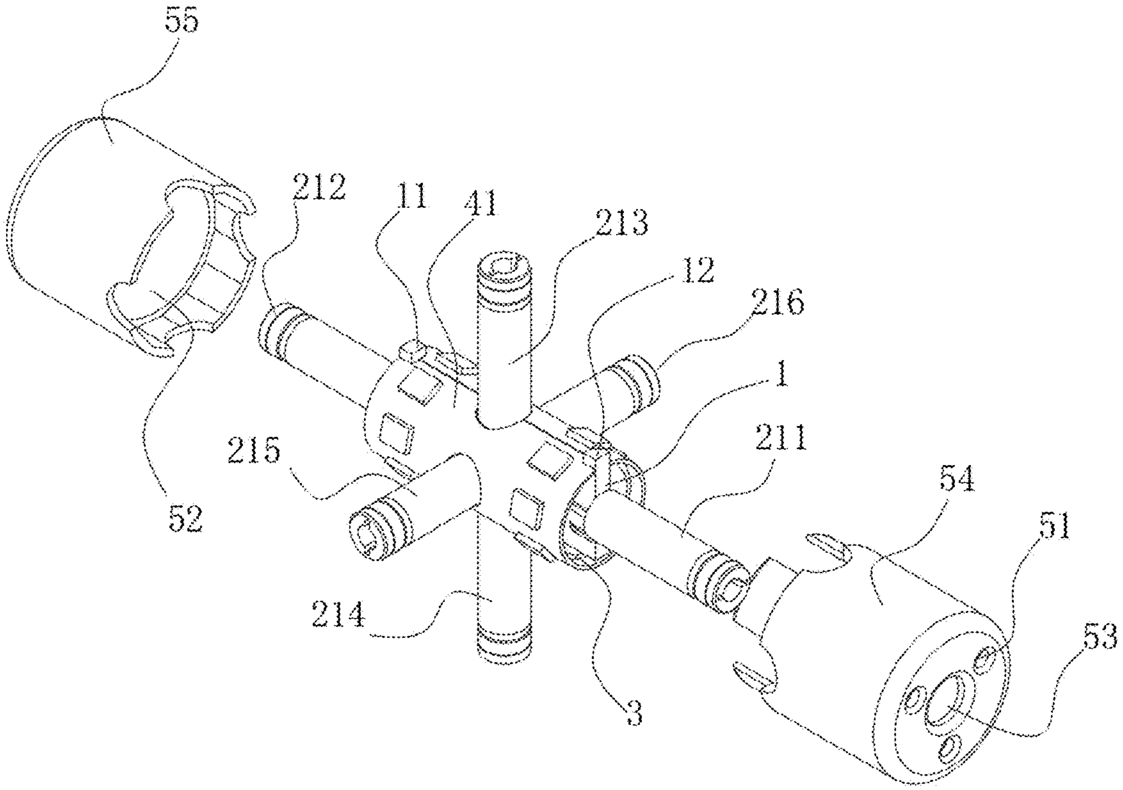
FIG. 38 is an exploded schematic diagram of the light-emitting body according to one embodiment of the present disclosure where the light-emitting body comprises one lampshade and six circular plugs.

In one embodiment, as shown in FIGS. 31-32, the second circuit structure 41 of each of the light-emitting bodies 10 further comprises a second extension portion 415. When each two adjacent light-emitting bodies 10 are plugged with each other, the second circuit structures 41 between each two of the light-emitting bodies are gaplessly connected. It should be noted that when a one-dimensional linear lamp is formed by the light-emitting bodies 10, the light emitted by the one-dimensional linear lamp is continuous and uniform, and a length of the one-dimensional linear lamp is adjusted by adjusting the number of the light-emitting bodies 10. That is, the second circuit structure 41 and the adapter connecting piece 3 of each of the light-emitting bodies 10 exceed the two ends of the first circuit structure 1 of each of the light-emitting bodies 10, thereby half-covering or fully covering the two circular plugs 21 on the first circuit structure 1 of each of the light-emitting bodies 10, so as to achieve a wider range of the light. In addition, when assembling the light-emitting bodies 10, the light-emitting bodies 10 are seamlessly connected to completely hide the circular plugs 21 thereof, so that the one-dimensional linear lamp has good continuity as a whole.

As shown in FIGS. 33-39, the present disclosure provides a lamp 30. The lamp 30 comprises a lampshade 5 and the light-emitting body 10 disposed in the lampshade 5. The lampshade 5 provides dustproof and waterproof protection for the second circuit structure 41 and the first circuit structure 1 of the light-emitting body 10 and is easy to assemble.

As shown in FIG. 40, in one embodiment, the lamp 30 further comprises a power connecting terminal 6 capable of being inserted into the light-emitting body 10, and the lampshade comprises a mounting opening matched with the power connecting terminal. When the power connecting terminal 6 is connected to the mounting opening 56 of the lampshade 5, the power connecting terminal 6 is electrically connected to the light-emitting body 10 and supports the light-emitting body 10. When the power connecting terminal 6 is screwed with the mounting opening 56 of the lampshade 5, the power connecting terminal 6 is electrically connected to the light-emitting body 10 and support the light-emitting body. In one embodiment, one light-emitting body is connected to another light-emitting body through circular plugs 21 thereof, and two light-emitting bodies are connected to the power connecting terminal 6 through the circular plugs 21. After completing a connection thereof, when any one end of the power connecting terminal 6 rotates, in addition to realizing circuit connection and signal connection at a plug-in position, the circular plug 21 connected the any one end of the power connecting terminal is rotated with respect to another circular plug. Therefore, when lamps 30 connected together rotate, the first circuit structures 1 located between two power terminals 6 are not damaged due to the relative rotation of the two power connecting terminals 6 when the power connecting terminals 6 are respectively screwed into the mounting openings 56.

As shown in FIGS. 33-39, in one embodiment, the lampshade 5 comprises threaded holes 51 for being fixedly connected to external devices. In one embodiment, an accommodating cavity 52 matched with the light-emitting body is defined in the lampshade 5. Connecting holes 53 for the power connectors 2 to pass through are defined in the lampshade 5. The light-emitting body is disposed in the accommodating cavity 52, and the power connectors 2 of the light-emitting body extends from the connecting holes 53. In one embodiment, the lampshade 5 comprises a first cover body 54 and a second cover body 55. The first cover body 54 and the second cover body 55 are detachably connected. When the first cover body 54 and the second cover body 55 are connected, the accommodating cavity 52 is formed inside the first cover body 54 and the second cover body 55. The connection method between the first cover body 54 and the second cover body 55 comprises a snap connection, a sleeve-type interference fit connection, or a threaded connection.

Figure 39:
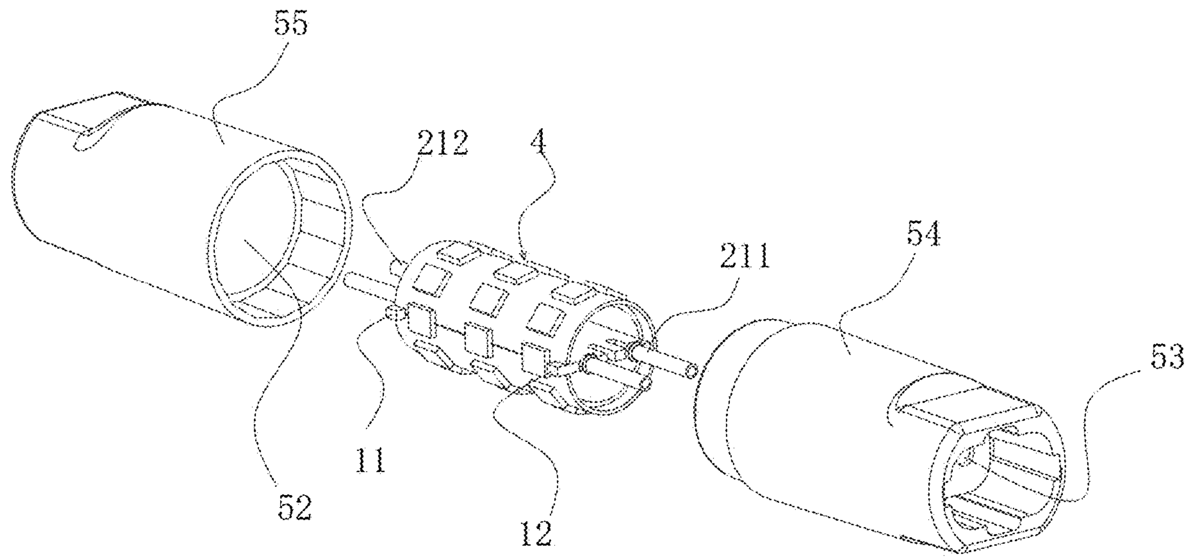
FIG. 39 is an exploded schematic diagram of the light-emitting body according to another embodiment of the present disclosure where the light-emitting body comprises one lampshade and two circular plugs.

As shown in FIG. 39, in one embodiment, each end surfaces where each of the connecting holes 53 is located is concave with respect to an outer surface of the lampshade 5. Therefore, when being plugged into a power adapter, a corresponding power connector 2 is hidden to provide power connection protection.

As shown in FIG. 40, two power connectors 2 are respectively disposed at two ends of the light-emitting body. Two mounting openings 56 with internal threads are correspondingly defined on the lampshade 5. Two power connecting terminals 6 are provided. Each of the power connecting terminals 6 comprises external threads matched with the internal threads of any one of the mounting openings 56, so that each of the power connecting terminals 6 is capable of being screwed with any one of the mounting openings 56.

During assembly, a first one of the power connectors 2 disposed on the first end of the light-emitting body is first partially plugged into a first one of the power connecting terminals 6. The light-emitting body is plugged into the lampshade 5 from a first one of the mounting openings 56 through the first one of the power connecting terminals 6, and then the first one of the power connecting terminals 6 is tightly screwed with the first one of the mounting openings 56. Then, a second one of the power connecting terminals 6 is inserted into a second one of the mounting openings 56 and is aligned with a second one of the power connectors 2 disposed on the second end of the light-emitting body, and the second one of the power connecting terminals 6 is tightly screwed with the second one of the mounting openings 56, so the second one of the power connecting terminals 6 is plugged with the second one of the power connectors 2 disposed on the second end of the light-emitting body. Optionally, the light-emitting body is a single light-emitting body, or the light-emitting body may be replaced with the one-dimensional linear lamp, a two-dimensional linear lamp, or a three-dimensional linear lamp that is assembled by connecting the light-emitting bodies together. Optionally, a plurality of lampshades 5 may be connected via a plurality of power connecting terminals 6 to form a lamp string.

In one embodiment, as shown in FIGS. 28-30, the power connectors comprise the male plug 217 and the female plug 218 for plugging. When the light-emitting bodies are connected together, each two adjacent light-emitting bodies are plugged with each other, so that the light-emitting bodies are connected freely to shape into different shapes.

Figure 41:
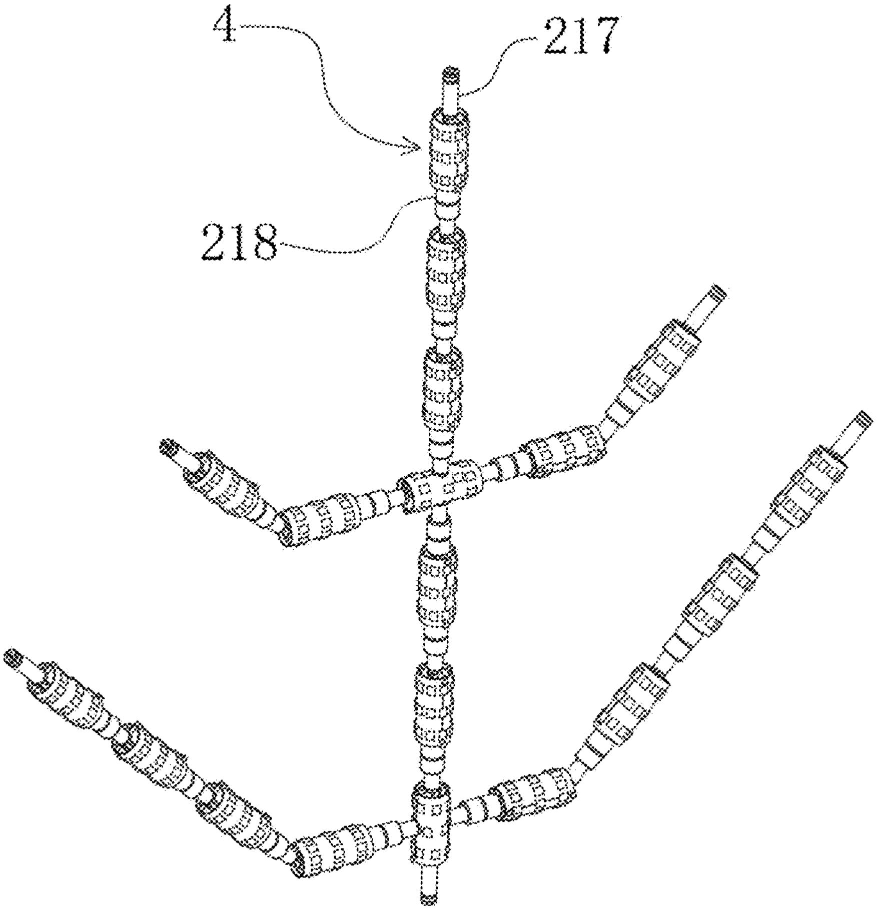
FIG. 41 is a structural schematic diagram of a tree-shaped lamp according to one embodiment of the present disclosure

As shown in FIG. 41, the light-emitting bodies are connected together to form a tree-shaped lamp.

Figure 42:
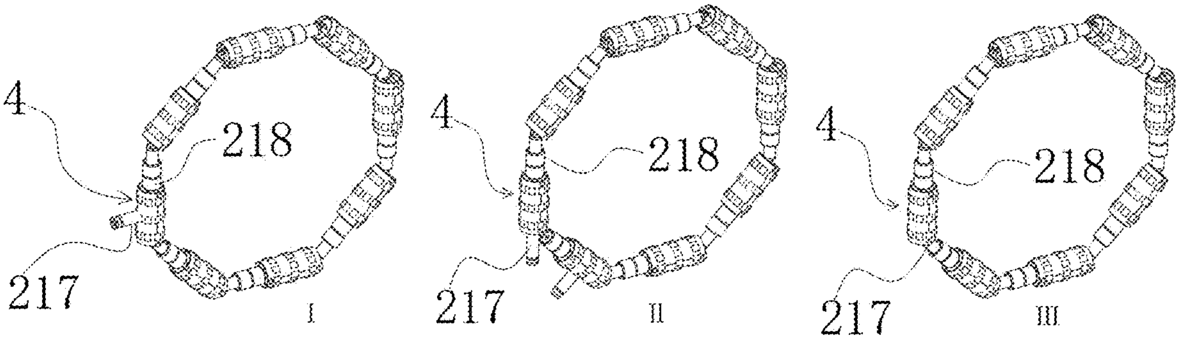
FIG. 42 is a structural schematic diagram of three different ring-shape lamps according to one embodiment of the present disclosure

As shown in FIG. 42, the light-emitting bodies are connected to form different ring-shaped lamps.

Figure 43:
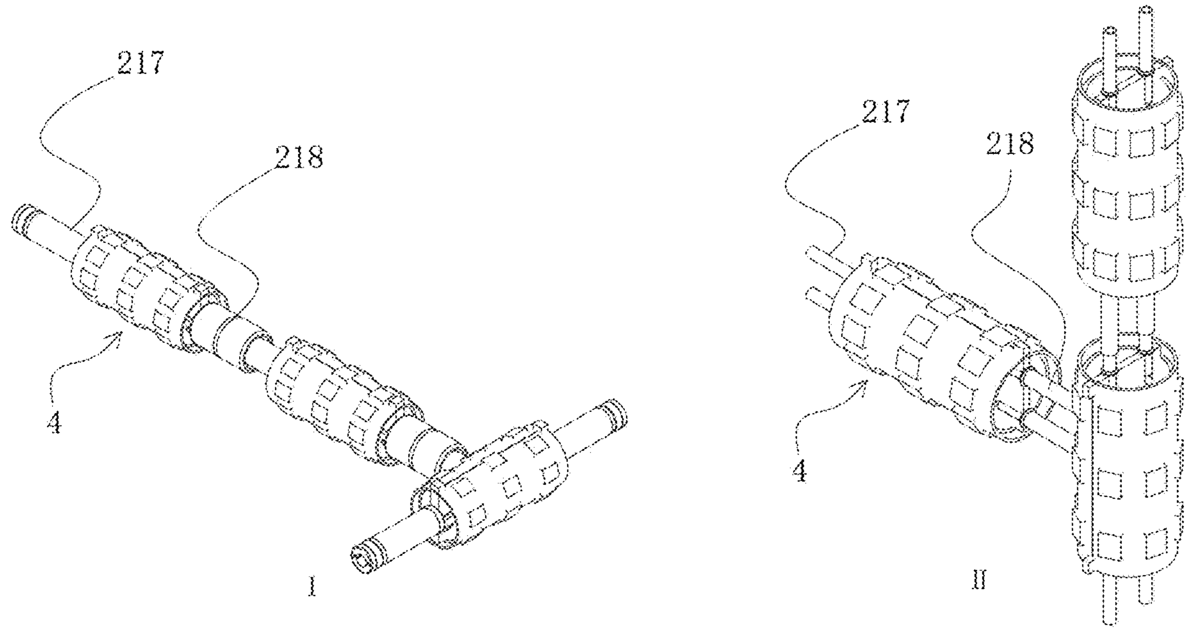
FIG. 43 is a structural schematic diagram of two two-dimensional linearly connected lamps according to one embodiment of the present disclosure.
Figure 44:
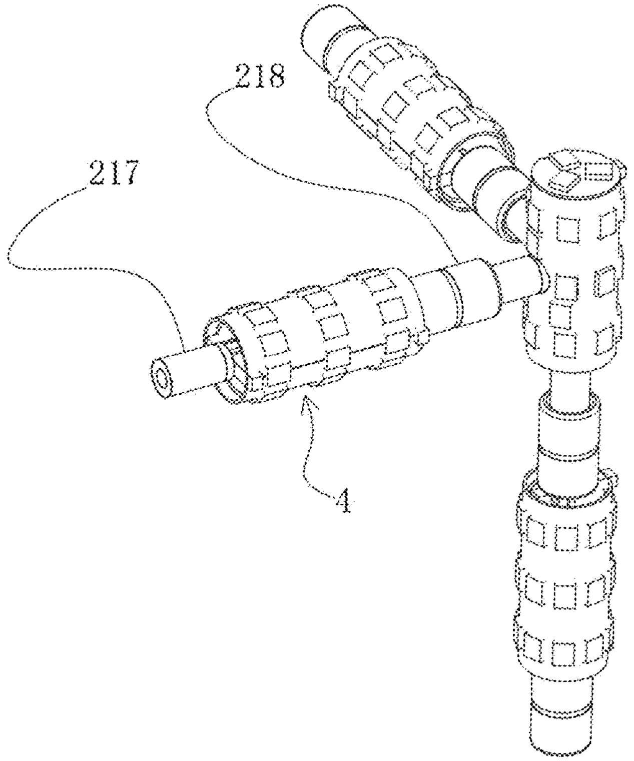
FIG. 44 is a structural schematic diagram of a three-dimensional linearly connected lamp according to one embodiment of the present disclosure.
Figure 45:
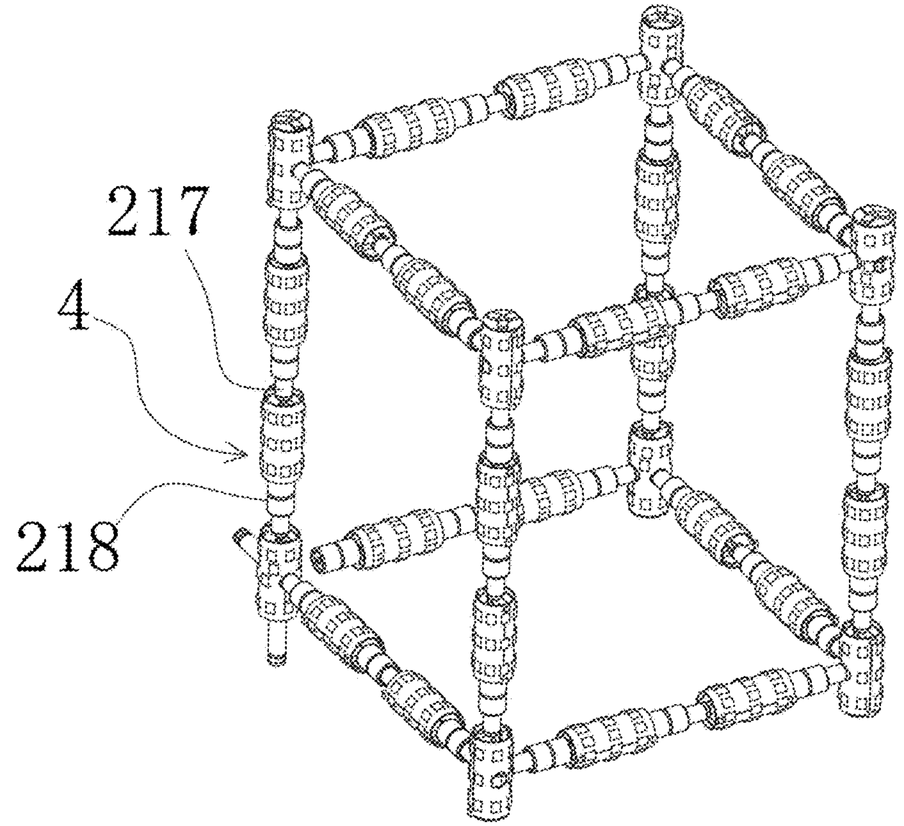
FIG. 45 is a structural schematic diagram of a cubic lamp according to one embodiment of the present disclosure.

The light-emitting bodies are connected to form the one-dimensional linear lamp (as shown in FIG. 27), the two-dimensional linear lamp (as shown in FIG. 43), the three-dimensional lamp (as shown in FIG. 44), a cubic lamp (as shown in FIG. 45), etc.

Figure 46:
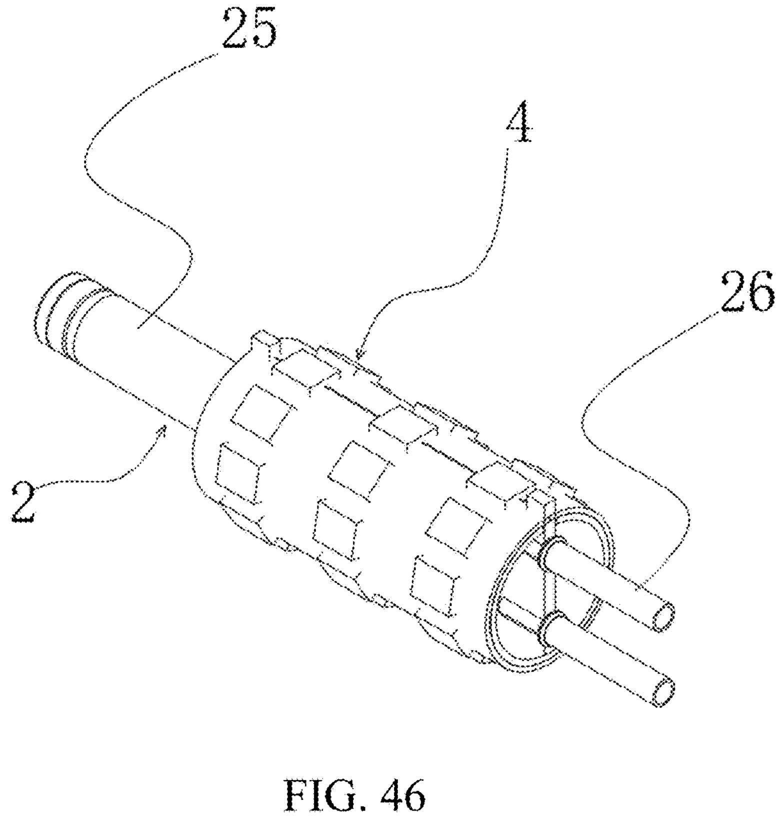
FIG. 46 is a structural schematic diagram of the light-emitting body according to one embodiment of the present disclosure where the light-emitting body comprises a single-pin plug and a double-pin plug.
Figure 47:
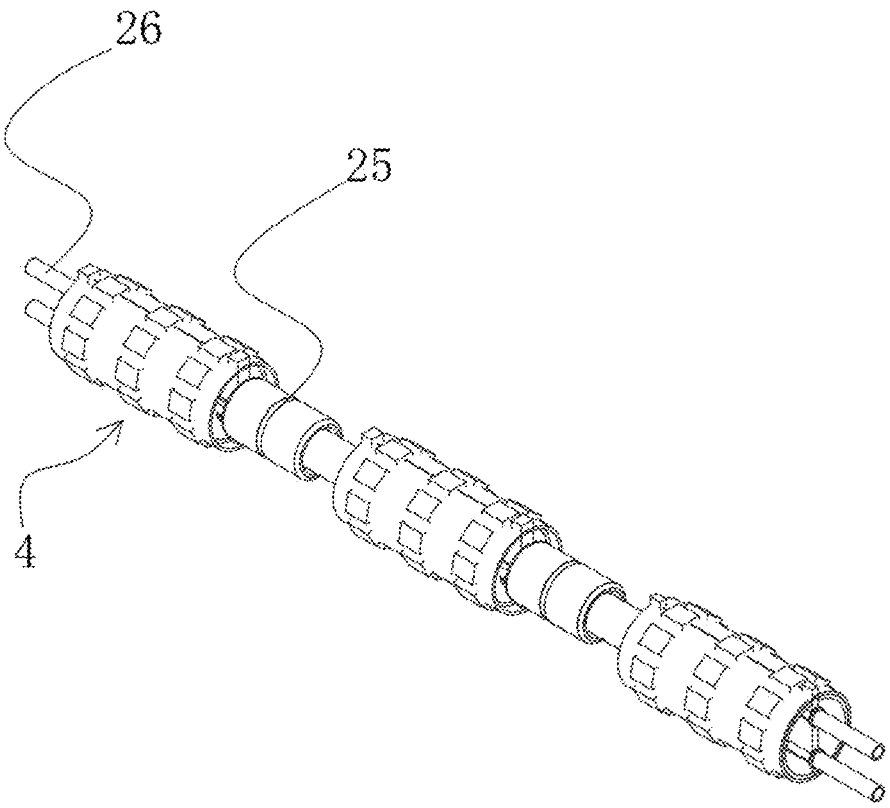
FIG. 47 is a structural schematic diagram of a linear lamp according to one embodiment of the present disclosure where the light-emitting bodies each including the single-pin plug and the double-pin plug are connected to the light-emitting body including single-pin plugs.
Figure 48:
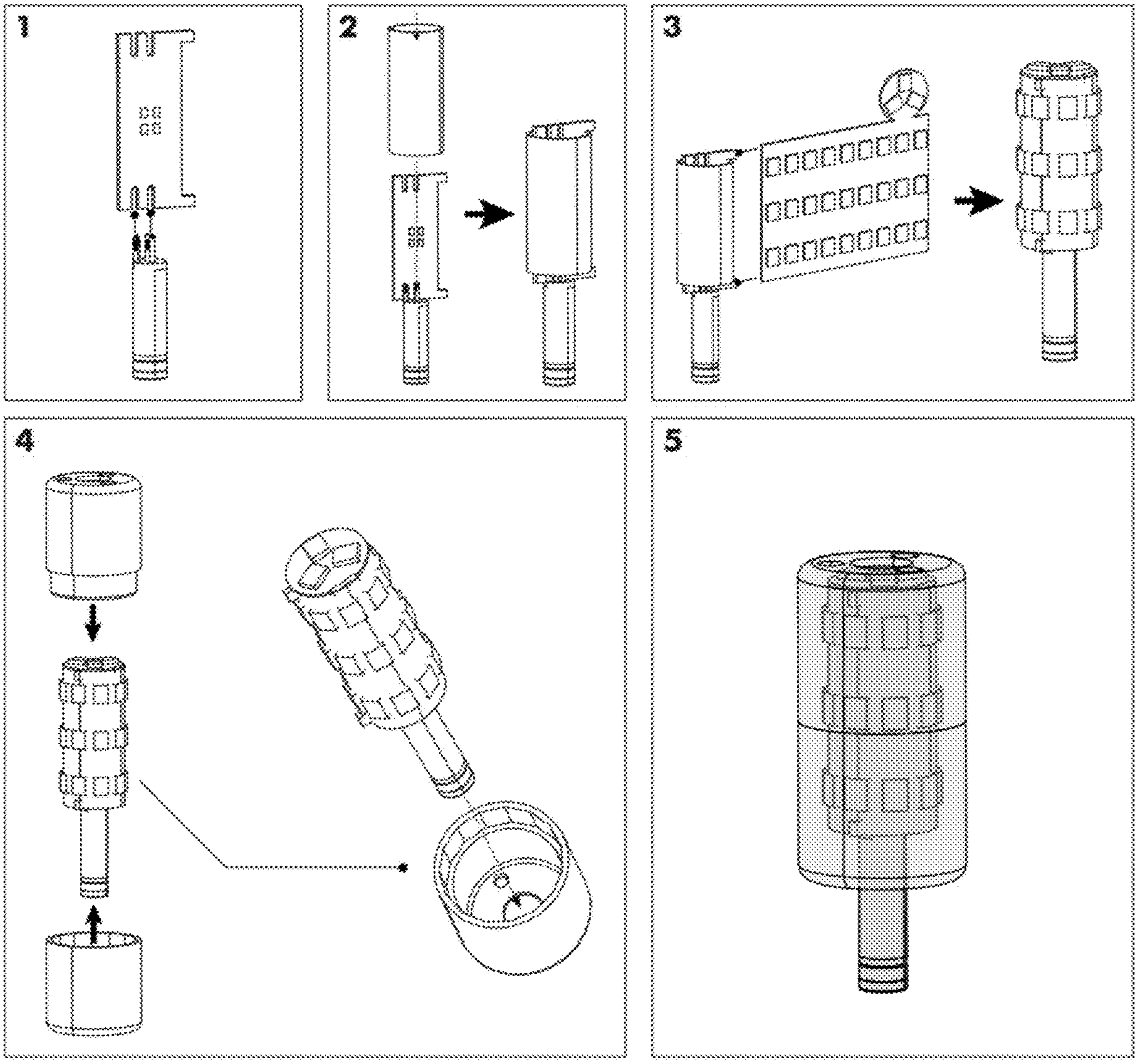
FIG. 48 is a schematic diagram of a process for assembling the light-emitting body with the circular plug according to one embodiment of the present disclosure.
Figure 49:
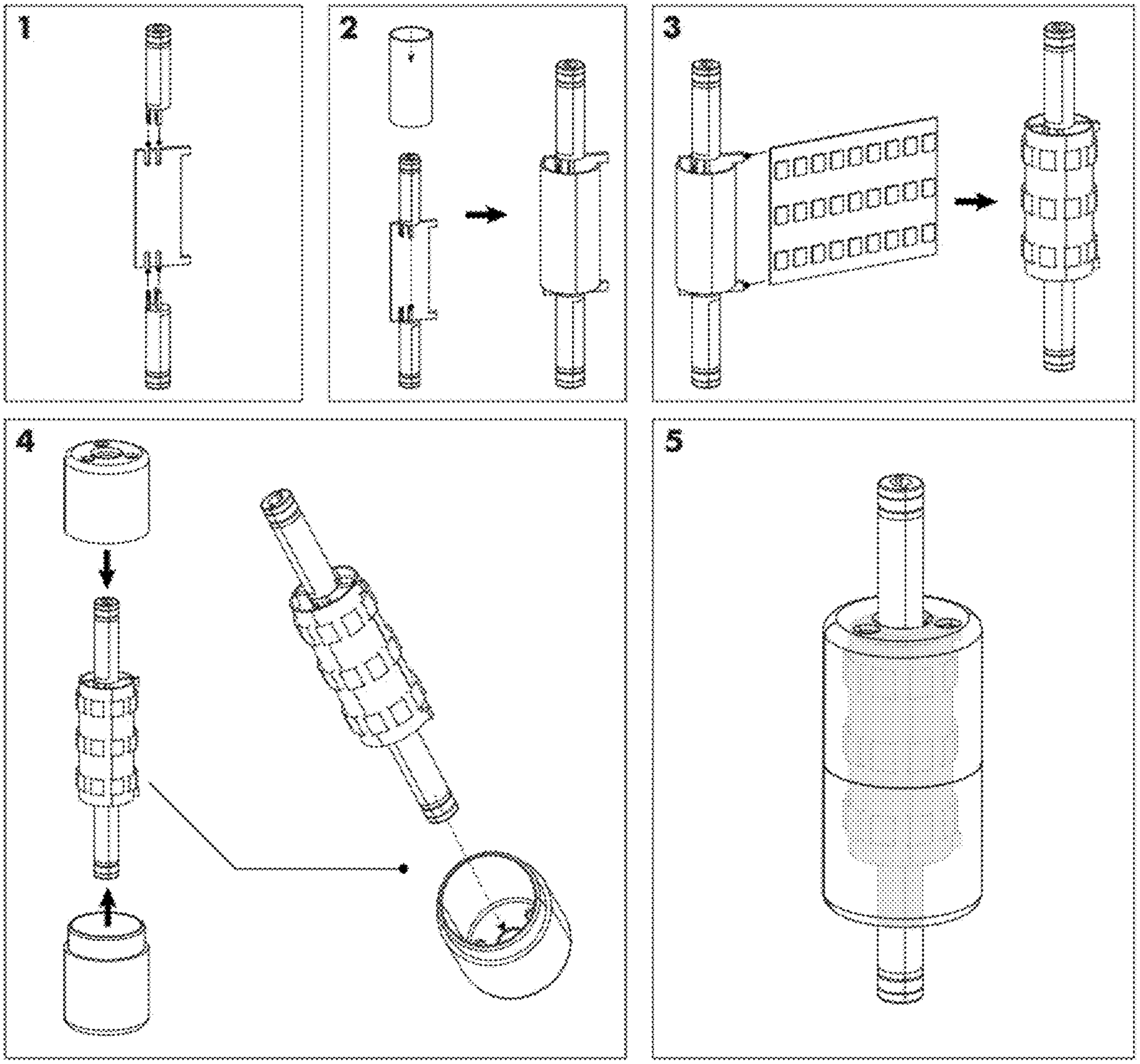
FIG. 49 is a schematic diagram of a process for assembling the light-emitting body with two circular plugs according to one embodiment of the present disclosure.
Figure 50:
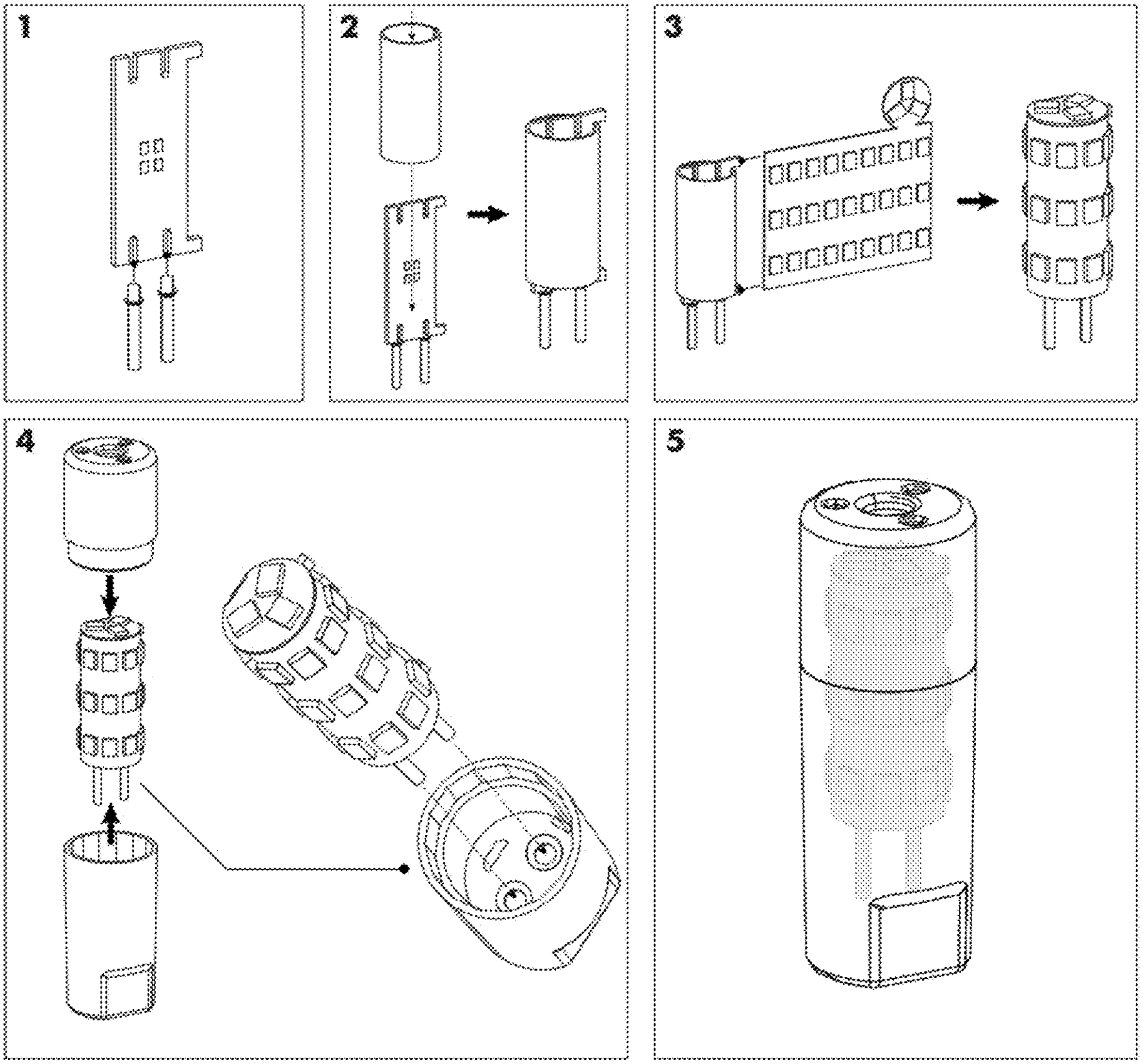
FIG. 50 is a schematic diagram of a process for assembling the light-emitting body with a double-pin plug according to one embodiment of the present disclosure.
Figure 51:
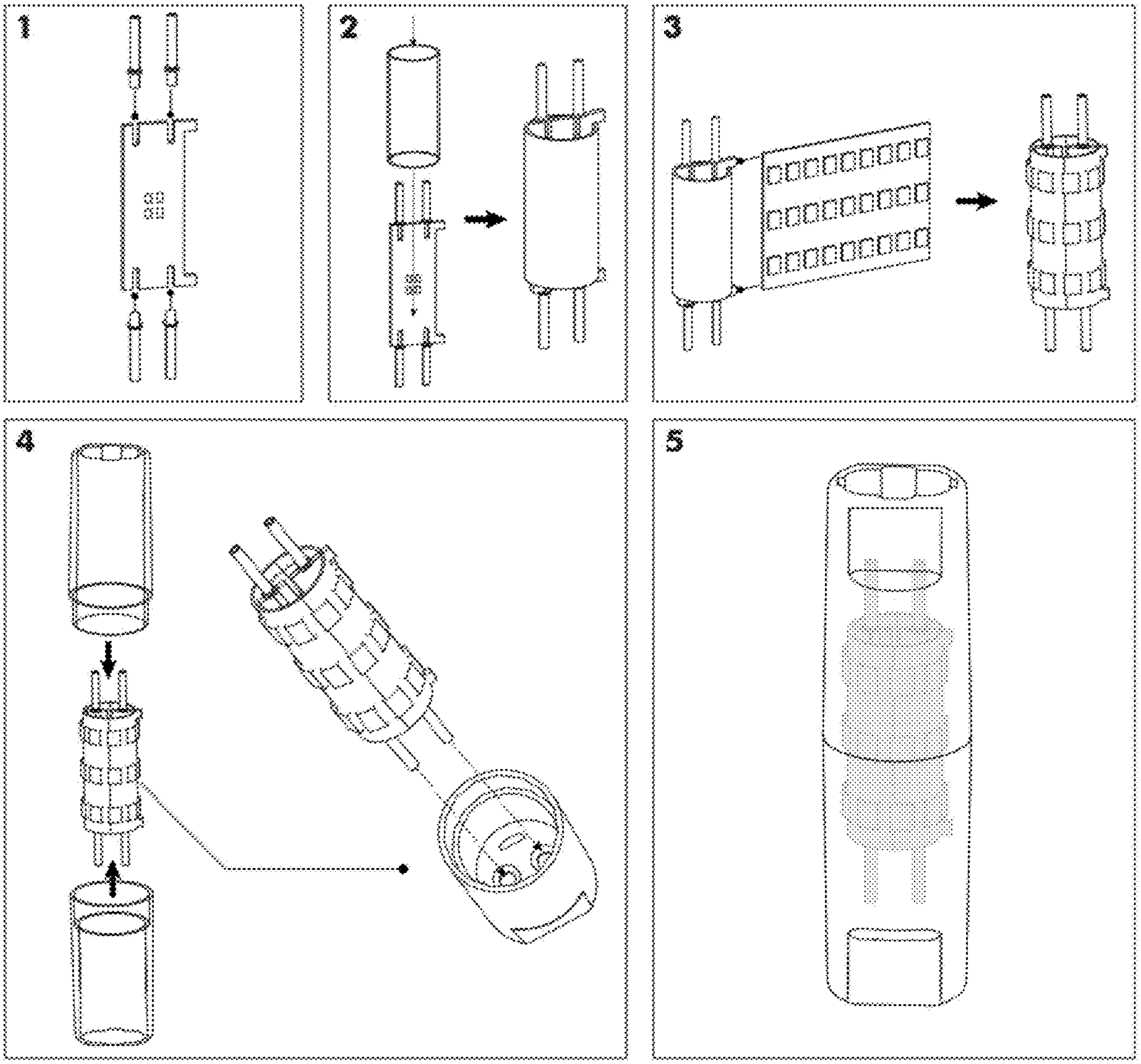
FIG. 51 is a schematic diagram of a process for assembling the light-emitting body with two double-pin plugs according to one embodiment of the present disclosure.
Figure 52:
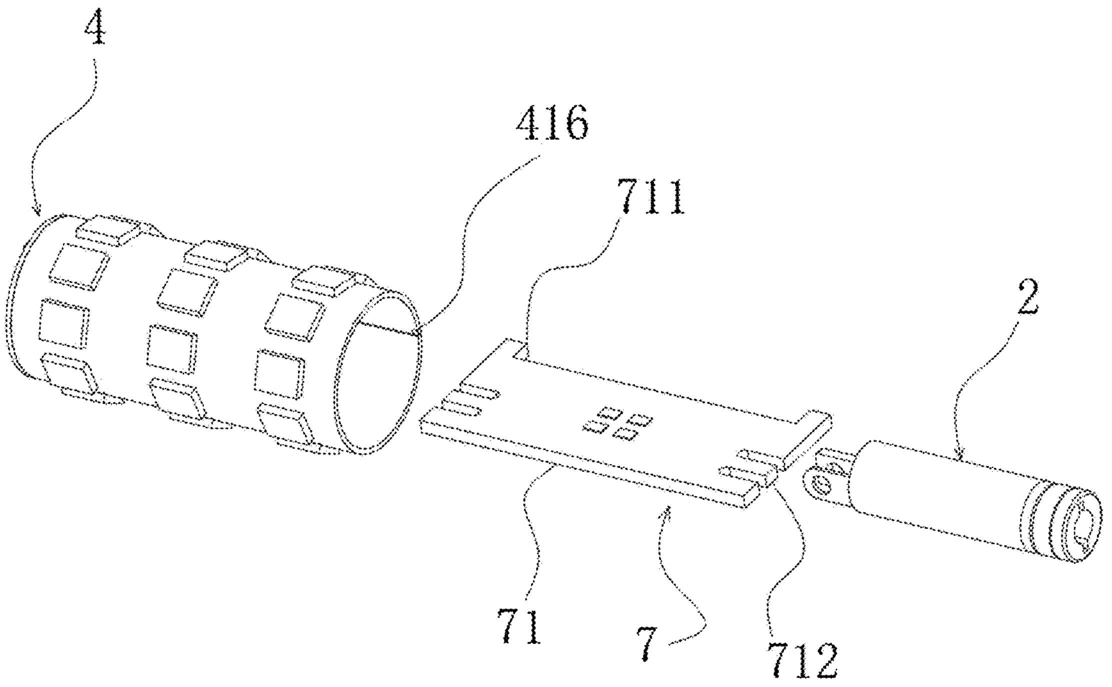
FIG. 52 is an exploded schematic diagram of a light-emitting device according to one embodiment of the present disclosure.
Figure 53:
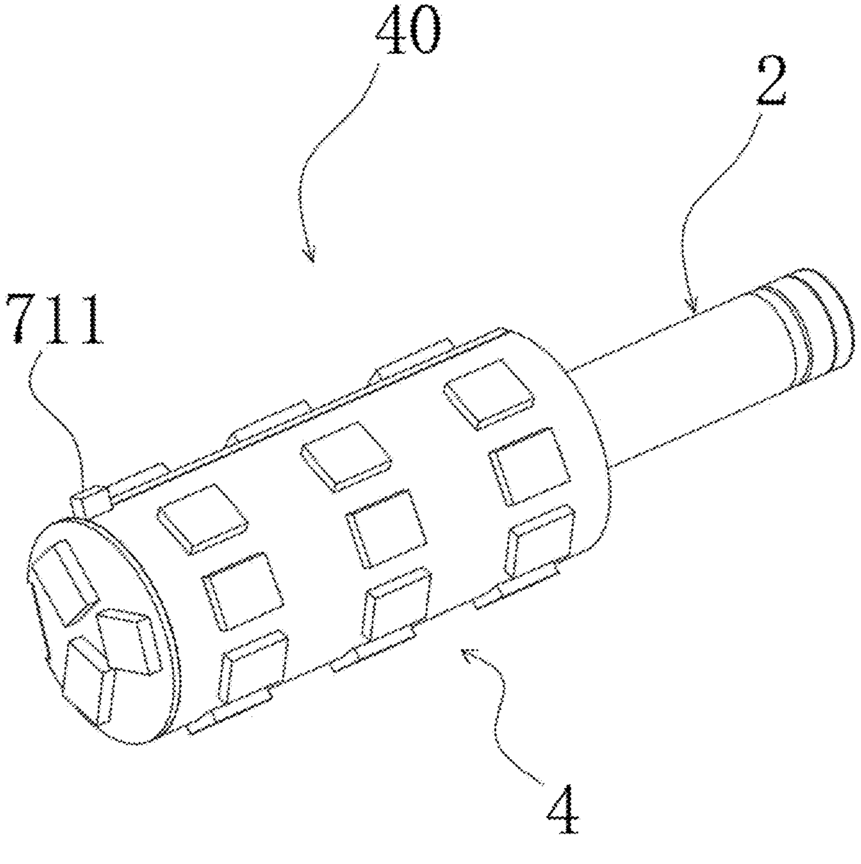
FIG. 53 is a structural schematic diagram of the light-emitting device according to one embodiment of the present disclosure.
Figure 54:
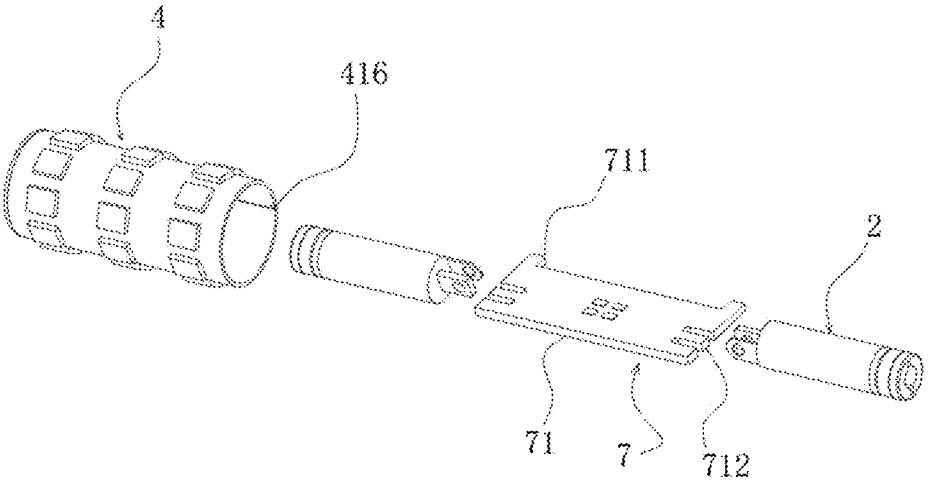
FIG. 54 is an exploded schematic diagram of the light-emitting device according to another embodiment of the present disclosure.
Figure 55:
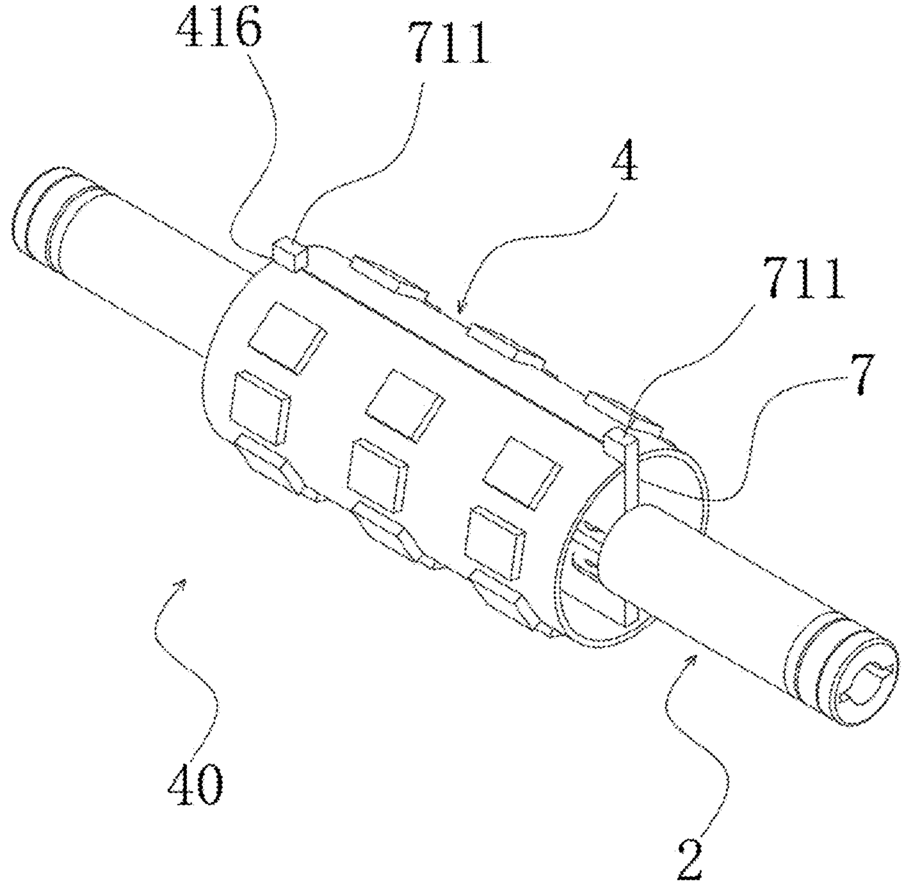
FIG. 55 is a structural schematic diagram of the light-emitting device according to another embodiment of the present disclosure.

In one embodiment, as shown in FIGS. 46 and 47, the power connectors 2 of the light-emitting body comprise a single-pin plug 25 and a double-pin plug 26. The single-pin plug 25 is disposed on the first end of the first circuit structure 1, and the double-pin plug 26 is disposed on the second end of the first circuit structure 1. In the one-dimensional linear lamp (as shown in FIG. 47), each of the light-emitting bodies respectively disposed on two ends of the one-dimensional linear lamp comprises the single-pin plug 25 and the double-pin plug, and the other light-emitting bodies in the one-dimensional linear lamp each comprise the male plug 217 and the female plug 218. The single-pin plug is the male plug 217 or the female plug 218, so different light-emitting bodies is capable of being plugged together. The power connectors disposed on the two ends of the one-dimensional linear lamp are double-pin plugs 26, and each double-pin plug 26 is capable of being connected to a corresponding power connecting terminal 6. Therefore, the one-dimensional linear lamp is allowed to be mounted in the lampshade 5, and the light-emitting bodies are rotatable relative to each other. Therefore, the first circuit structures 1 of the one-dimensional linear lamp are not damaged due to rotation of any one of the power terminals 6 when any one of the power terminal 6 is screwed into a corresponding one of the mounting openings 56.

As shown in FIGS. 48-51, an assembly process of the light-emitting body of the present disclosure is as follow:

connecting the first circuit structure to the at least one power connector 2;

sleeving the adapter connecting piece on the first circuit structure;

wingding the second circuit structure on the adapter connecting piece, enabling the positive electrode and the negative electrode of the second circuit structure 41 being respectively electrically connected to the first protrusion 11 and the second protrusion 12 on the first circuit structure 1; and sleeving the lampshade 5 on the light-emitting body to complete the assembly of the light-emitting body with the lampshade 5.

After the light-emitting bodies are assembled, each two adjacent light-emitting bodies are plugged with each other to shape the light-emitting bodies into different lamps.

In one embodiment, as shown in FIGS. 31-32, the second circuit structure 41 of each of the light-emitting bodies further comprises a second extension portion 415. When each two adjacent light-emitting bodies are plugged with each other, the second circuit structures 41 between each two of the light-emitting bodies are gaplessly connected.

In one embodiment, the second extension portion 415 of the second circuit structure 41 and the adapter connecting piece 3 of each of the light-emitting bodies 10 exceed the two ends of the first circuit structure 1 of each of the light-emitting bodies 10, thereby half-covering or fully covering the two circular plugs 21 on the first circuit structure 1 of each of the light-emitting bodies 10, so as to achieve a wider range of the light. In addition, when assembling the light-emitting bodies 10, the light-emitting bodies 10 are seamlessly connected to completely hide the circular plugs 21 thereof, so that the one-dimensional linear lamp has good continuity as a whole.

As shown in FIGS. 52-55, the present disclosure provides a light-emitting device 40 assembled by modular assembly. The light-emitting device comprises a mainboard 7, at least one power connector 2, and a light-emitting unit 4.

In one embodiment, the mainboard 7 comprises a first electric connecting portion 71 protruded from an edge of a board body 71 of the mainboard. In one alternative embodiment, the mainboard 7 comprises two first electric connecting portions 711 protruded from the edge of the board body 71 of the mainboard 7. The mainboard 7 comprises at least one second electric connecting portion 711 disposed on the board body 71.

The at least one power connector 2 is electrically connected to the at least one second electric connecting portion 712. When power connectors 2 are provided, second electric connecting portions 712 one-to-one corresponding to the power connectors 2 are provided. The power connectors are detachably connected to the second electric connecting portions. Each power connector is configured to electrically connect to an external power connecting terminal 6.

The light-emitting unit 4 comprises at least one third electric connecting portion electrically connected to the at least one first electric connecting portion, and the mainboard 7 is configured to control the light-emitting unit 4 to emit light.

The light-emitting unit 4 is disposed around the board body 71, and a portion of the at least one power connector that is electrically connected to the external power connecting terminal is exposed to the light-emitting unit.

The above description of the disclosed embodiments enables those skilled in the art to implement or use the present disclosure. A variety of modifications to these embodiments are apparent to those skilled in the art, and general principles defined in the specification can be implemented in other embodiments without departing from the spirit or scope of the present disclosure. Thus, the present disclosure should not be limited to the embodiments disclosed herein, and should be subject to the widest scope consistent with the principles and novel features disclosed herein.

What is claimed is:

1. A light-emitting body assembled by modular assembly, comprising:

a first circuit structure;

at least one power connector; and a light-emitting unit;

wherein the first circuit structure comprises a first protrusion, the least one power connector is rigidly connected to one end of the first circuit structure, the first circuit structure is electrically connected to an external power connecting terminal through the least one power connector, the light-emitting unit is disposed around the first circuit structure, and the light-emitting unit is electrically connected to the first protrusion;

wherein the light-emitting body further comprises at least one adapter connecting piece, the at least one adapter connecting piece is connected to the first circuit structure, the light-emitting unit is disposed around the first circuit structure through the at least one adapter connecting piece, and at least a portion of the first protrusion extends out of an outer side of the at least one adapter connecting piece;

wherein the first circuit structure further comprises a second protrusion, and at least one side of the at least one adapter connecting piece is clamped between the first protrusion and the second protrusion;

wherein the adapter connecting piece comprises a deformable piece, the deformable piece is integrally formed, and the deformable piece defines a cavity penetrating through two ends of the deformable piece;

wherein when the deformable piece is compressed, the cavity is shaped into a flat-shaped cavity, and when a width of the flat-shaped cavity is matched with a width of the first circuit structure, the at least one adapter connecting piece is allowed to be sleeved on the first circuit structure;

wherein when the at least one adapter connecting piece resets, the at least one side of the at least one adapter connecting piece is clamped between the first protrusion and the second protrusion.

2. The light-emitting body according to claim 1, wherein the at least one adapter connecting piece further comprises a first hinge and a second hinge, the first hinge and the second hinge are detachably connected, and the first hinge and the second hinge are clamped on the first circuit structure.

3. The light-emitting body according to claim 1, wherein the light-emitting unit comprises a second circuit structure, lamp beads are disposed on the second circuit structure, the second circuit structure covers on the outer side of the at least one adapter connecting piece, and the second circuit structure is electrically connected to at least one of the first protrusion and the second protrusion.

4. The light-emitting body according to claim 1, wherein the at least one power connector comprises a positive access terminal, a negative access terminal, and a control signal access terminal, the control signal access terminal is configured to transmit a signal for controlling a color of the light-emitting unit.

5. The light-emitting body according to claim 4, wherein the at least one power connector comprises a circular plug, the positive access terminal and the negative access terminal of the circular plug are disposed in an axial direction; or the positive access terminal, the negative access terminal, and the control signal access terminal are disposed in the axial direction.

6. The light-emitting body according to claim 1, wherein the at least one power connector is disposed at a predetermined angle, and the predetermined angle is in a range of 0-180 degrees.

7. The light-emitting body according to claim 3, wherein the second circuit structure further comprises a first extension portion, the lamp beads are disposed on the first extension portion, and a shape of the first extension portion is matched with an opening defined on a first end of the cavity, the first extension portion is connected to the opening defined on the first end of the cavity, and the power connector extends out of the at least one adapter connecting piece from an opening defined a second end of the cavity.

8. The light-emitting body according to claim 3, wherein the at least one power connector comprises circular plugs for plugging, the circular plugs comprise a first plug and a second plug, and the first plug and the second plug respectively extend out of two ends of the cavity.

9. The light-emitting body according to claim 8, wherein the circular plugs further comprise a third plug connected to the first circuit structure, the third plug is disposed perpendicular to the first plug or the second plug, the first circuit structure is disposed on two sides of the third plug, adapter connecting pieces are disposed on two sides of the first circuit structure, a through hole is defined on a middle portion of the second circuit structure, the through hole is matched with the third plug, and when the second circuit structure is covered on the adapter connecting pieces, the third plug passes through the through hole.

10. The light-emitting body according to claim 9, wherein the circular plugs further comprise a fourth plug, the fourth plug is disposed on the first circuit structure, the fourth plug is disposed on a same side of the light-emitting body as the first protrusion or the second protrusion, the third plug and the fourth plug are symmetrically disposed on the first circuit structure, semicircular grooves are respectively defined on a first end and a second end of the second circuit structure, and the fourth plug is matched with the semicircular grooves.

11. A light-emitting body module, comprising: more than two light-emitting bodies according to claim 1;

wherein each two adjacent light-emitting bodies are plugged with each other.

12. The light-emitting body module according to claim 11, wherein the at least one power connector of each of the light-emitting bodies comprises a male plug and a female plug;

the male plug of each of the light-emitting bodies is configured to plug with the female plug of an adjacent light-emitting body, the female plug f each of the light-emitting bodies is configured to plug with the male plug of another adjacent light-emitting body, each two adjacent light-emitting bodies are plugged with each other, so that the light-emitting bodies are connected freely to shape into different shapes.

13. The light-emitting body module according to claim 12, wherein the light-emitting bodies comprises second circuit structures, each of the second circuit structures comprises a second extension portion, and when each two adjacent light-emitting bodies are plugged with each other, the second circuit structures between each two adjacent light-emitting bodies are gaplessly connected.

14. A lamp, comprising:

a lampshade, and at least one light-emitting body according to claim 1;

wherein the at least one light-emitting body is disposed in the lampshade, the at least one power connector extends out of the lampshade; or the lamp further comprises at least one power connecting terminal capable of being inserted into the at least one light-emitting body, the lampshade comprises at least one mounting opening matched with the at least one power connecting terminal, and when the at least one power connecting terminal is connected to the at least one mounting opening of the lampshade, the at least one power connecting terminal is electrically connected to the light-emitting body and supports the at least one light-emitting body.

15. The lamp according to claim 11, wherein light-emitting bodies are provided, the light-emitting bodies comprises second circuit boards, each of the second circuit boards comprises a second extension portion, when the light-emitting bodies are connected together, each two adjacent second circuit boards are gaplessly connected.

* * * * *